US012590879B2

(12) United States Patent
Wang et al.

(10) Patent No.: US 12,590,879 B2
(45) Date of Patent: Mar. 31, 2026

(54) AEROSOL MOBILITY IMAGING

(71) Applicants: Aerosol Dynamics Inc., Berkeley, CA (US); Washington University, St. Louis, MO (US)

(72) Inventors: Jian Wang, St. Louis, MO (US); Steven Russel Spielman, Oakland, CA (US); Jiaoshi Zhang, St. Louis, MO (US); Susanne Vera Hering, Berkeley, CA (US); Jing Li, St. Louis, MO (US)

(73) Assignees: Aerosol Dynamics Inc.; Washington University

( * ) Notice: Subject to any disclaimer, the term of this patent is extended or adjusted under 35 U.S.C. 154(b) by 520 days.

(21) Appl. No.: 18/160,948

(22) Filed: Jan. 27, 2023

(65) Prior Publication Data

US 2023/0280254 A1 Sep. 7, 2023

Related U.S. Application Data

(60) Provisional application No. 63/304,476, filed on Jan. 28, 2022.

(51) Int. Cl.
*G01N 15/02* (2024.01)
*G01N 1/22* (2006.01)

(52) U.S. Cl.
CPC ....... *G01N 15/0266* (2013.01); *G01N 1/2202* (2013.01); *G01N 2001/2223* (2013.01)

(58) Field of Classification Search
CPC ......... G01N 1/2202; G01N 2001/2223; G01N 15/0266; G01N 15/065; G01N 15/0255; G01N 15/0205; G01N 2015/0681
See application file for complete search history.

(56) References Cited

U.S. PATENT DOCUMENTS 5,166,537 A * 11/1992 Horiuchi .............. G01N 15/132 250/573
5,872,622 A * 2/1999 Schildmeyer ........ G01N 15/065 356/37

(Continued)

FOREIGN PATENT DOCUMENTS

JP 2001133387 A 5/2001

OTHER PUBLICATIONS

International Search Report and Written Opinion dated May 22, 2023, International Application No. PCT/US2023/061499, 11 pages.

(Continued)

*Primary Examiner* — Sang H Nguyen
(74) *Attorney, Agent, or Firm* — PEARL COHEN ZEDEK LATZER BARATZ LLP

(57) ABSTRACT

A system and method to measure a size distribution of particles based on their electrical mobility. The method includes: introducing, via a sheath flow inlet, a particle free sheath flow into a chamber formed by two parallel walls which are separated by a gap, the chamber having a width and a length, the sheath flow having a direction along the length of the chamber and flowing a laminar manner; introducing an aerosol sample flow into the chamber downstream of the sheath inlet such that the aerosol sample flow joins the particle free sheath flow in a laminar manner; applying an electric field between the two parallel walls of the chamber, the field having a strength which varies across the width of the chamber; extracting an output aerosol flow through a first outlet downstream of the sample inlet; and outputting an excess flow equal to a sum of the sheath flow and aerosol sample flow minus the output aerosol flow. The method may also include: passing the output aerosol flow through a growth cell in a laminar manner, the growth cell having a region of wetted walls with two or more temperature regions such that the particles within the output aerosol (Continued)

flow grow by condensation to form droplets, and such that relative positions of droplets are indicative of particle electrical mobility; and counting and capturing a spatial position of individual droplets exiting the growth cell.

20 Claims, 20 Drawing Sheets

(56) References Cited

U.S. PATENT DOCUMENTS

| | | | | |
|---|---|---|---|---|
| 6,379,419 | B1 * | 4/2002 | Celik | B22F 9/12 75/346 |
| 6,712,881 | B2 | 3/2004 | Hering et al. | |
| 7,298,486 | B2 | 11/2007 | Wang et al. | |
| 8,801,838 | B2 | 8/2014 | Hering et al. | |
| 9,395,281 | B2 | 7/2016 | Wang et al. | |
| 2002/0014441 | A1 * | 2/2002 | Yoshida | G01N 15/0266 428/323 |
| 2004/0086159 | A1 * | 5/2004 | Lary | G01N 15/1425 382/128 |
| 2006/0146327 | A1 * | 7/2006 | Wang | G01N 15/0266 356/338 |
| 2008/0083274 | A1 * | 4/2008 | Hering | G01N 15/065 73/170.19 |
| 2010/0001184 | A1 * | 1/2010 | Chen | G01N 15/0266 977/773 |
| 2011/0116092 | A1 | 5/2011 | Wang | |
| 2015/0268140 | A1 * | 9/2015 | Wang | G01N 15/065 356/335 |

OTHER PUBLICATIONS

Flagan, Richard C. "History of Electrical Aerosol Measurements", Aerosol Science and Technology 28:4, 1998, pp. 301-380.
Flagan, Richard C. "On Differential Mobility Analyzer Resolution", Aerosol Science & Technology 30:6, 1999, pp. 556-570.
Hering, Susanne V. et al., "A Method for Particle Size Amplification by Water Condensation in a Laminar, Thermally Diffusive Flow", Aerosol Science and Technology 39, Mar. 2005, pp. 428-436.
Hering, Susanne V. et al., "Moderated, Water-Based, Condensational Particle Growth in a Laminar Flow", Aerosol Science and Technology 48:4, 2014, pp. 401-408.
Hudson, James G. et al., "An Improved Continuous Flow Diffusion Cloud Chamber", Journal of Applied Meteorology and Climatology, vol. 15, Jul. 1976, pp. 776-782.
Li, Yiran et al., "Measuring size distributions of atmospheric aerosols using natural air ions", Aerosol Science and Technology, vol. 56, No. 7, 2022, pp. 655-664.
Liu, Benjamin Y.H. et al., "A Submicron Aerosol Standard and the Primary, Absolute Calibration of the Condensation Nuclei Counter", Journal of Colloid and Interface Science, vol. 47, No. 1, Apr. 1974, pp. 155-171.
Tammet, H. et al., "Electrical aerosol spectrometer of Tartu University", Atmospheric Research 62, 2002, pp. 315-324.
Kulkarni, Pramod et al., "New fast integrated mobility spectrometer for real-time measurement of aerosol size distribution-I: Concept and theory", Journal of Aerosol Science 37, 2006, pp. 1303-1325.
Kulkarni, Pramod et al., "New fast integrated mobility spectrometer for real-time measurement of aerosol size distribution: II. Design, calibration, and performance characterization", Journal of Aerosol Science 37, 2006, pp. 1326-1339.
Pinterich, Tamara, et al. "A water-based fast integrated mobility spectrometer (WFIMS) with enhanced dynamic size range", Aerosol Science and Technology, vol. 51, No. 10, 2017, pp. 1212-1222.
Spielman, Steven R. et al., "Preliminary investigation of a water-based method for fast integrating mobility spectrometry", Aerosol Science and Technology, vol. 51, No. 10, 2017, pp. 1223-1230.
Wang, Jian "A fast integrated mobility spectrometer with wide dynamic size range: Theoretical analysis and numerical simulation", Journal of Aerosol Science 40, 2009, pp. 890-906.
Wang, Jian et al., "A fast integrated mobility spectrometer for rapid measurement of sub-micrometer aerosol size distribution, Part I: Design and model evaluation", Journal of Aerosol Science 108, 2017, pp. 44-55.
Wang, Jian et al., "A fast integrated mobility spectrometer for rapid measurement of sub-micrometer aerosol size distribution, Part II: Experimental characterization", Journal of Aerosol Science 113, 2017, pp. 119-129.
Wiedensohler, Alfred "An Approximation of the Bipolar Charge Distribution for Particles in the Submicron Size Range", Journal of Aerosol Science, vol. 19, No. 3, 1988, pp. 387-389.
International Preliminary Report on Patentability dated Aug. 8, 2024, International Application No. PCT/US2023/061499, 9 pages.
Communication pursuant to Rules 161(1) and 162 EPC dated Sep. 4, 2024, European Patent Application No. 23706979.4, 3 pages.
Response to Communication pursuant to Rules 161(1) and 162 EPC dated Mar. 4, 2025, European Patent Application No. 23706979.4, 18 pages.

* cited by examiner 20 nm

10 Hz image one frame

AEROSOL MOBILITY IMAGING

CLAIM OF PRIORITY

This application claims priority to U.S. Provisional Patent Application No. 63/304,476, entitled "AEROSOL MOBILITY IMAGING", filed Jan. 28, 2022, which application is incorporated by reference herein in its entirety.

STATEMENT REGARDING FEDERALLY SPONSORED RESEARCH OR DEVELOPMENT

This invention was made with government support under DE-SC0020495 awarded by the Department of Energy. The government has certain rights in the invention.

FIELD

The disclosure pertains to the measurement of the size and concentration of particles suspended in air or other gas.

BACKGROUND

The size distribution of airborne particles is an important parameter to evaluating their effects on human health, and on the environment. Particle size is also an important parameter in inhalation exposure, as it is a determining factor in respiratory deposition. In the atmosphere, the size and concentration of particles play a critical role in the Earth's radiation balance, both through direct scattering of light and through modification of micro-physical characteristics, and persistence of clouds. Those particles in the size range below 1000 nm are especially important.

Current methods for measuring particle size and concentration in the size range from a few nanometers to several hundred nanometers are based on electrical mobility. The most common approach is differential mobility analysis, wherein a single mobility size is selected from an input polydisperse particle source by applying an appropriate voltage on a mobility drift tube and are counted by a downstream detector such as a condensation particle counter. The size of the selected particle depends on drift tube geometry, flow rates and applied voltages. Size distributions are obtained by sequential measurements at different drift tube voltage settings, a process that can take several minutes. Another, faster electrical mobility approach is an electrometer-based system, wherein multiple mobility sizes are measured at once by placement of a series of electrometers along the collection electrode of the electrical mobility drift tube. While this approach offers high time resolution, it is limited to higher concentration aerosols, and does not have the sensitivity needed for atmospheric research.

SUMMARY

Technology is provided for rapidly measuring a particle size distribution of airborne particles or other gas borne particles, defined as the concentration of suspended particles as a function of their size. The method includes an electrical mobility separator coupled to an extraction growth cell and an optical imaging system. The mobility separator has two parallel plates across which a spatially varying electric field is applied. A sample flow of airborne particles and a sheath flow of particle-free air are directed between the plates. Those airborne particles that carry net electric charge are size-classified due to the motion of particles in the electric field. At the exit of the mobility separator, particles are separated spatially based on their mobility size, such that each position corresponds to a unique size. Immediately downstream of the separator plates, a flow containing spatially separated, size-classified particles is extracted through a slit that extends across the width of one of the plates. Particles within the extracted flow are spatially separated by size, due to the variation in the electric field. The extracted flow is directed through an extraction growth cell that enlarges the suspended particles through vapor condensation to form droplets. At the exit of the extraction growth cell the flow passes through a laser beam, and the droplets are imaged onto a photodetector or CCD array. The photodetector array captures the position of individual droplets, from which the initial particle size is derived. The rate of droplet detection at each position is related to the concentration at the size corresponding to that position. These data, combined with flow rates and charging efficiency, yields the particle size distribution. In contrast with existing differential mobility analysis methods that sequentially step through particle sizes one at a time, the present technology captures the concentration of particles over a range of sizes all at once.

Implementations may include a controller that executes code to control air flow rates, the electric fields within the separator, the laser illumination intensity and that captures and processes data from the photo diode array.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

The present disclosure pertains to the measurement of particle size and concentration of particles suspended in air or other gas based on the principles of electrical mobility and condensation particle counting. Electrical mobility relates to the motion of a gas-borne particle in an electric field. The particle motion is characterized by a drift velocity, which is the velocity at which the aerodynamic resistance balances the electrostatic force. The ratio of this drift velocity to the strength of the electrostatic field is the particle electrical mobility. Condensation particle counting is a means by which a small particle is enlarged by condensation of a liquid onto the particle, enabling its detection by optical means. The technology disclosed herein may be referred to as aerosol mobility imaging. A mobility imaging system spatially separates particles based on their electrical mobility, samples a subset of those spatially separated particles, subsequently enlarges the sampled particles through condensation of water vapor or other condensable fluid in a manner that maintains their relative positions within the sampled flow, and images those enlarged particles onto a photodetector array. The technology is applicable to measuring the size distribution of airborne particles in the size range from around 5 nm to about 500 nm.

This present disclosure describes a method that is both rapid and sensitive. Particle size and concentration are measured over this size range from around 10 nm to about 400 nm with a time resolution of about 1 sec, and with sufficient sensitivity for measurements at concentrations of order of a few thousand particles per cubic centimeter. The present disclosure also provides techniques for capturing size-classified particles in a size-dependent manner that can be used for subsequent chemical or elemental analysis to give a compositional-dependent size distribution.

Figure 1:
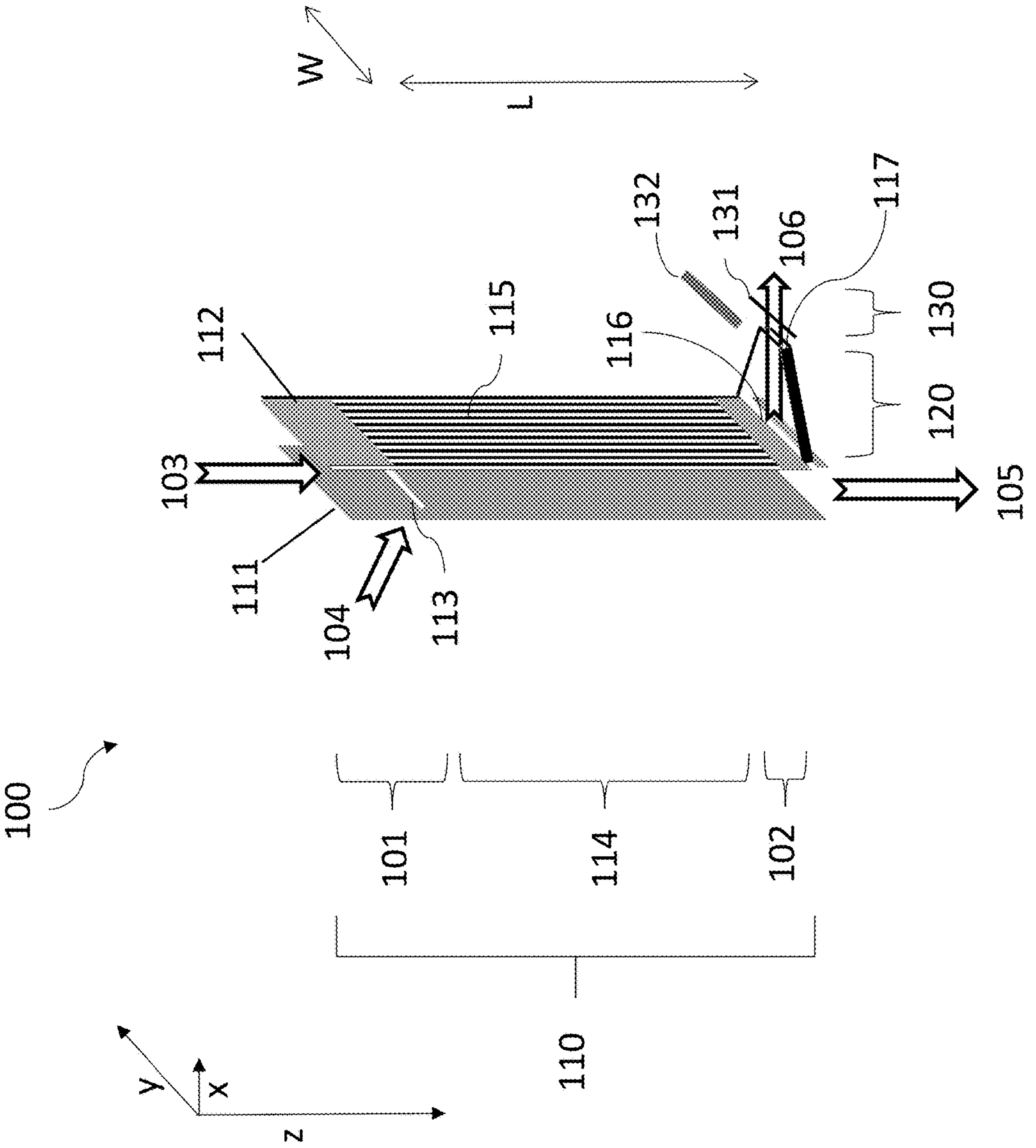
FIG. 1 is a schematic of an aerosol mobility imaging system.

An embodiment 100 of the aerosol mobility imaging technology is illustrated schematically in FIG. 1. The aerosol mobility imaging (AMI) system 100, consists of a mobility separator 110, and an extraction growth cell 120 and imaging system 130. The mobility separator 110 has two parallel planes 111 and 112, each formed by one or more plates. Air flows between these two planes from an inlet region 101 to an outlet region 102 in a laminar manner. The majority of the flow entering the inlet region is a particle-free sheath flow 103. A smaller portion of the flow entering the inlet region is an aerosol sample flow 104 which enters through inlet slit 113 and joins the sheath flow in a laminar manner. In the outlet region 102 a portion of the flow 106, referred to as the extracted flow, exits the mobility separator through extraction slit 116 and is subsequently directed through the extraction growth cell 120 and imaging system 130. The inlet slit 113 is located in the inlet region of the plane 111, and the extraction slit is located in the outlet region of the opposite plane 112. Both the inlet slit and the extraction slit both extend across most of the width of their respective planes (in the direction of the y-coordinate of FIG. 1). The remaining flow exits as an excess flow 105. In many instances it is desirable for the magnitude of the extraction flow 106 to equal that of the inlet flow 104. In this circumstance, the exit flow 105 can be recirculated through a particle filter by means of a blower or pump and reintroduced as the sheath flow 103. Typically, the mobility separator 110 measures between 250 mm and 350 mm in length L (z-coordinate), between 100-150 mm in width W (y-coordinate) with a separation between the plates $\delta$ (x-coordinate) of near 10 mm.

Between the inlet region 101 and the outlet region 102 is a separator region 114 containing a high voltage electrode 115. The electrode 115 may also extend into the inlet region 101, from above the aerosol inlet 104 to just above the outlet region 102. An electric field is applied between the planes 111 and 112 by means of a high voltage electrode 115. By placing electrode 115 such that it extends into the inlet region, the electric field is established prior to the introduction of the aerosol sample. On the other hand, if it is desired to condition the sample aerosol to the relative humidity of the sheath flow prior to size classification, the electrode 115 is placed in the separator region only, such that the aerosol sample is introduced prior to establishing the electric field. Either configuration may be used. The high voltage electrode 115 is configured such that the electric field is not uniform; rather the electric potential across the plates is higher in some regions and lower in other regions. In one implementation, plate 111 is held at ground potential and the high voltage electrode 115 is formed by multiple conductive traces on printed circuit board. Referring to FIG. 1, the electrode is formed by a set of parallel traces extending along the z-coordinate, spaced by a small distance from the neighboring trace. An individual trace may be about 0.15 mm wide, 200 mm long, and spaced by about 1 mm from the neighboring trace. There may be as many as 50 to 200 individual traces on the board that is the high voltage electrode 115. A fixed voltage is applied to each individual trace and the applied voltage varies among individual traces in a systematic manner. More specifically, the high voltage electrode 115 is configured such that the electric field varies across the width of the channel. Referring to FIG. 1, the electric field is varied along the y-coordinate but is mostly constant along the z-coordinate. Particle size classification is enabled by this electric field. The electric field lines are mostly orthogonal to the direction of flow, and charged particles move across the flow streamlines with a drift velocity that depends on their size and the local field strength. In this manner, particles introduced with the flow 104 are drawn across the particle-free sheath flow 103 in accordance with their electrical mobility and the local field strength.

In the exit region 102 of the separator 110, a portion of the flow 106 that nearest the plate 112 is extracted through extraction slit 116 and directed through the extraction growth cell 120 and imaging system 130. The extraction growth cell 120 focuses the flow by means of a converging channel and enlarges the suspended particles through water condensation. The shape of the converging channel is designed shrink the flow from the width W of the mobility separator (typically 12 cm) to a length that is readily imaged (1 cm-2 cm), while maintaining the relative positions of particles along the y-coordinate. The condensational enlargement is enabled by moistened walls, one of which has a section that is maintained at a warmer temperature than other portions of the walls. Water vapor from the warmed, wet wall diffuses into the flow, creating regions in which the relative humidity exceeds 100%. Those regions of humidity in excess of 100% are referred to as supersaturated. In these supersaturated regions water vapor condenses on the suspended particles, forming droplets. Each droplet has a single particle at its core. There is a one-to-one correspondence between the droplet and the particle around which it was formed. The higher the supersaturation, the smaller the particle that is activated to grow by vapor condensation. The extraction growth cell 120 is designed to activate particles as small as 7-10 nm, forming droplets that are several micrometers in diameter.

At the exit slit 117 of the extraction growth cell 120, the extracted flow 106 passes through an imaging system 130 consisting of a laser beam 131, focusing optics and a photodiode or charge coupled device (CCD) array 132. The droplets that have been formed by condensational enlargement of the particles in the extraction flow 106 are imaged onto a photodetector array 132. Once imaged, the droplets are counted as a function of the y-position. Because the electric field within the separator 110 varies in the y-direction, different y-positions correspond to different initial particle sizes. Images can be readily captured at 10 Hz. These data are combined with flow rates and particle charging probability to derive the particle size distribution. Typically, the system spans the particle size range from 8 nm-400 nm, providing size distributions over this entire size range with a time resolution of about 1 Hz.

Due to the hygroscopic nature of many aerosols, the size distribution obtained will depend on the relative humidity at which the measurement is made. Typically, it is desired to obtain particle size distributions under dry conditions, at relative humidity values below 25%. For these measurements the sheath flow 103 is conditioned to less than 25% relative humidity. Alternatively, if the measurement of the size distribution at a higher relative humidity is desired, the sheath flow will be conditioned to that higher relative humidity prior to introduction into the mobility separator. In essence, the relative humidity of the sheath flow determines the relative humidity at which the size distribution is measured.

The present technology can be used in which particles are suspended in a gas other than air. For example, aerosol size distributions in a gas such as nitrogen or argon could be measured by this approach by using particle free nitrogen or argon for the sheath flow. The present technology may be implemented using a condensable substance other than water in the growth region. For example, the walls within the extraction growth cell 120 can be saturated with alcohol, such as isopropanol or heptanol. Instead of forming droplets of water around each particle, the temperature differences within the growth cell results in the formation of alcohol droplets around individual particles. These alcohol droplets are then imaged and counted by the imaging system much the same as for water droplets.

The method described herein measures the distribution of particles with respect to their electrical mobility. This electrical mobility is related to the particle diameter by the relationship:

$$Z = \frac{neC_c}{3\pi\eta D_p}$$

where $D_p$ is the particle diameter, n is the net number of elementary charges (e) on the particle, $C_c$ is the Cunningham correction factor, and η is the air viscosity.

To derive the particle diameter from the electrical mobility requires knowledge of the net electrical charge on the particle. Standard practice is to expose the aerosol sample flow to a bipolar ion source prior to the mobility measurement. This charge conditioning step brings the charge distribution close to the equilibrium state, which has been well-described in the literature. Published charge distributions are used to infer the particle size distribution from the measured particle electrical mobility distribution.

This approach differs from the prior art that utilizing a spatially varying electric field system, in which the entire flow passing through the mobility separator is directed through a water-based condensation growth cell, and subsequently imaged. That approach requires a much larger system, as the growth cell must handle the entirety of the flow, and the laser and optics must illuminate and image the majority of the cross-sectional area. The present technology thus results in a remarkable reduction in overall size and power consumption. This is attributable (1) to an approximately 15-fold reduction in the flow that must be condensationally enlarged, and (2) to the focusing of the droplets into a narrow line prior to imaging. These two factors lead to an estimated factor of ten (10) reduction in size and power consumption while providing similar dynamic size range and time resolution.

Another advantage of the disclosed technology is higher mobility resolution. As in all mobility systems, the precision of the mobility measurement (i.e., mobility resolution) depends primarily on the ratio of the aerosol flow to the traversed sheath flow. In methods that image the entire flow at the exit of the separator, the mobility resolution depends on particle position. Those imaged particles closest to the ground electrode had traversed a smaller fraction of the sheath flow, and hence were not as highly resolved as those measured near the high voltage electrode. With the current technology, only this more highly resolved fraction, that nearest the high voltage electrode, is analyzed. This consistency allows us to increase the aerosol flow relative to the sheath flow while maintaining sufficient mobility resolution.

One embodiment of the high voltage electrode plate 115 is a complex high voltage electrode in which the field is varied along the y-direction by means of multiple traces on a printed circuit board in which the individual traces are held at differing potentials. The overall width of the electrode is governed by the maximum voltage step that can be tolerated between neighboring traces, combined with the voltage steps required for the particle size range to be measured. Additionally, the parameter most often of interest is the number concentration as a function of the logarithm of the particle size. To provide a spatial separation in the y-dimension of the separator that varies as the logarithm of particle size, voltage steps between neighboring traces should vary approximately exponentially along the y-dimension. In one embodiment, a system is provided in which the high voltage electrode plate 115 is about 12-15 cm in width W, where the width refers to the y-dimension of FIG. 1, orthogonal to the flow. Typically, the length of the separator L (along the z-axis) that holds the electrode plates is about 24 cm.

Figure 2A:
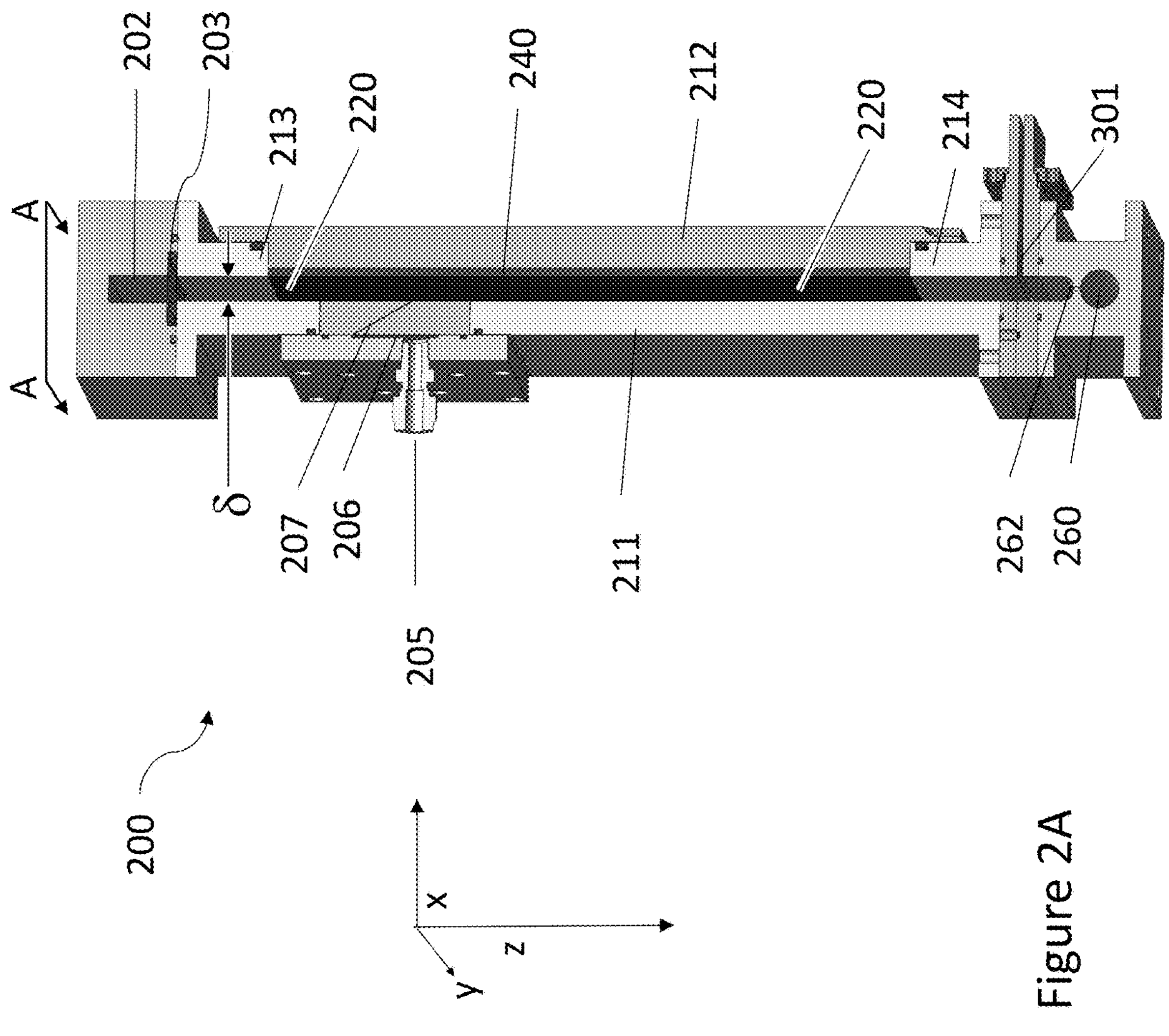
FIG. 2A is a cross sectional view of a three-dimensional depiction of an embodiment of a mobility separator and of an inlet region of the extraction growth cell.
Figure 2B:
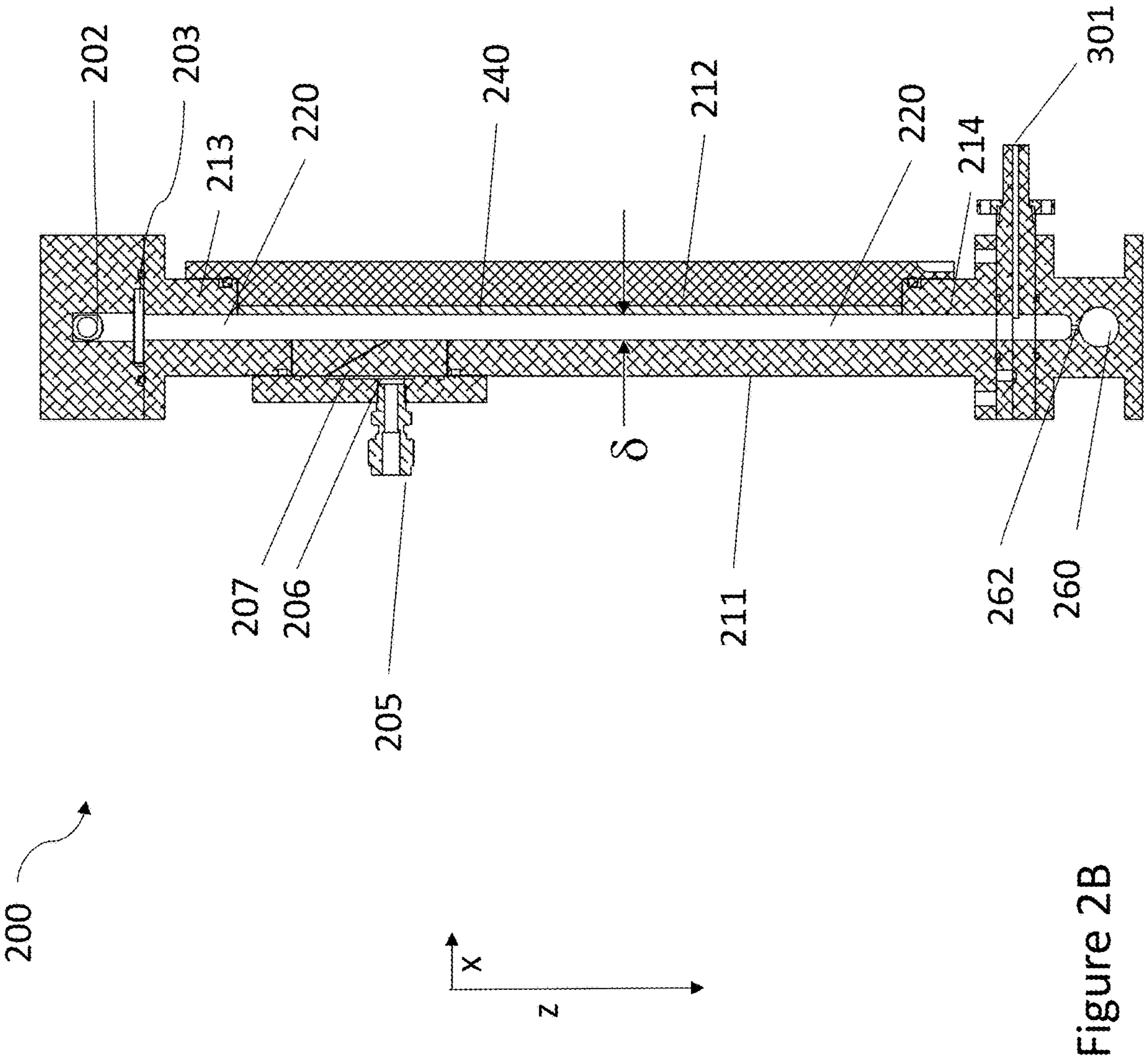
FIG. 2B is a planar view of the embodiment of FIG. 2A along line A-A in FIG. 2A.

An embodiment 200 of the mobility separator 110 is illustrated in FIGS. 2A and 2B. The particle-free sheath flow 103 enters through chamber 202 and is directed through flow straightening screen 203 into the separator channel 220. The separator channel 220 is bounded by the parallel walls formed by plate 211 and the high voltage electrode 240 mounted on plate 212, and connecting components 213 and 214. The channel 220 is 330 mm in length (z-coordinate), 127 mm in width (y-coordinate) with a separation between the plates (x-coordinate) of 9 mm. The aerosol flow 104 enters through port 205, is directed through a narrow channel 206 and through the inlet slit 207 and joins the sheath flow in the separator channel. The majority of the flow exits through the flow distribution holes 262 leading to exit port 260. The extraction flow 106 exits through extraction slit 301 and is directed through the extraction growth cell. The high voltage electrode 240 is mounted on plate 212 and extends most of the length of the separator channel. Generally, as discussed in FIG. 1, the electrode 240 is formed by multiple traces on a printed circuit board. In this embodiment, the high voltage electrode includes 60 parallel traces, each 0.15 mm wide, 190 mm long, and distributed with evenly at 1.0 mm apart. The electrode 240 is placed slightly upstream of the inlet slit 207 so that the field is fully established at the point the aerosol is introduced into the separator channel 220.

Figure 3A:
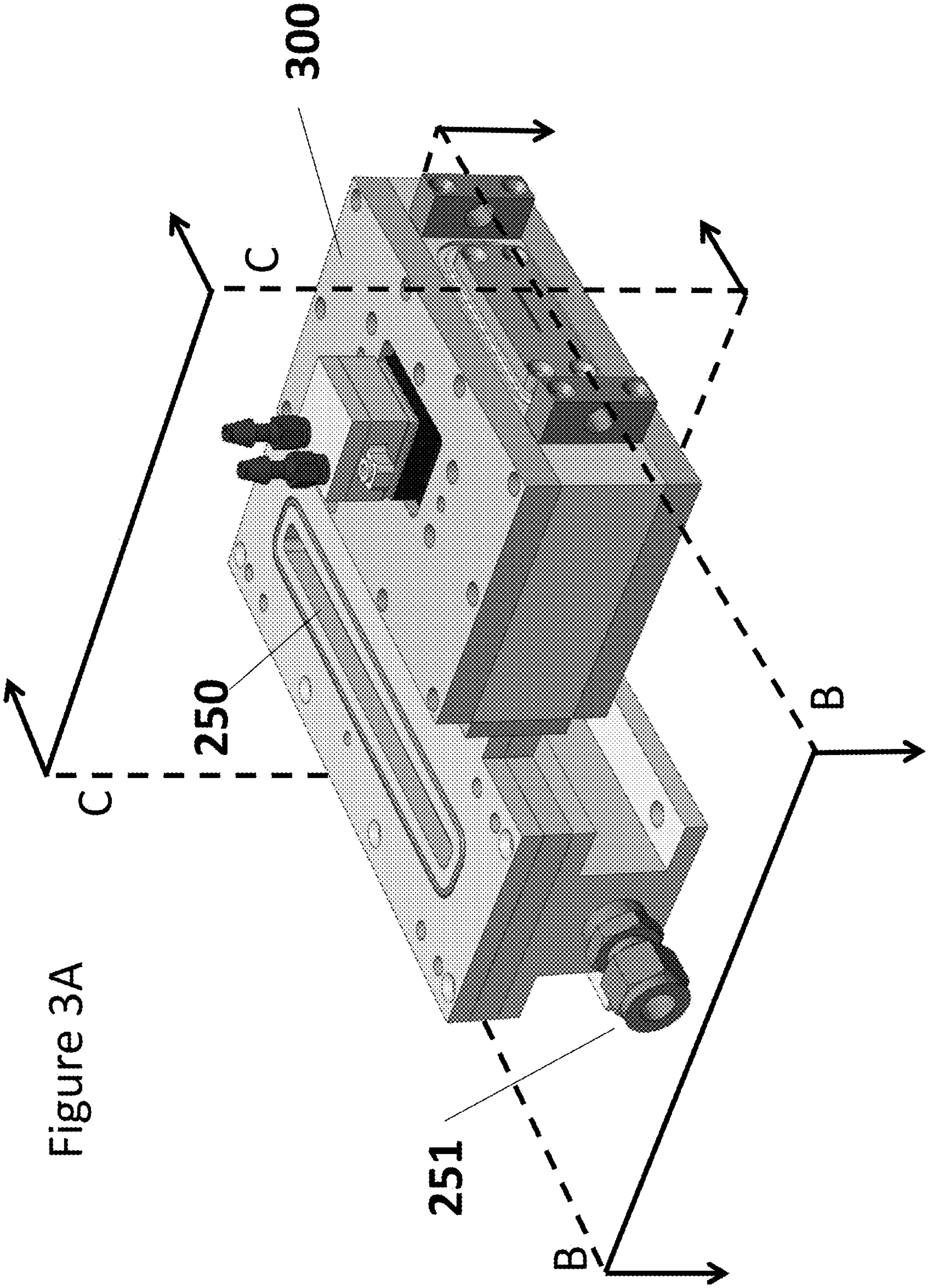
FIG. 3A is a perspective view of an embodiment of the extraction growth cell.
Figure 3B:
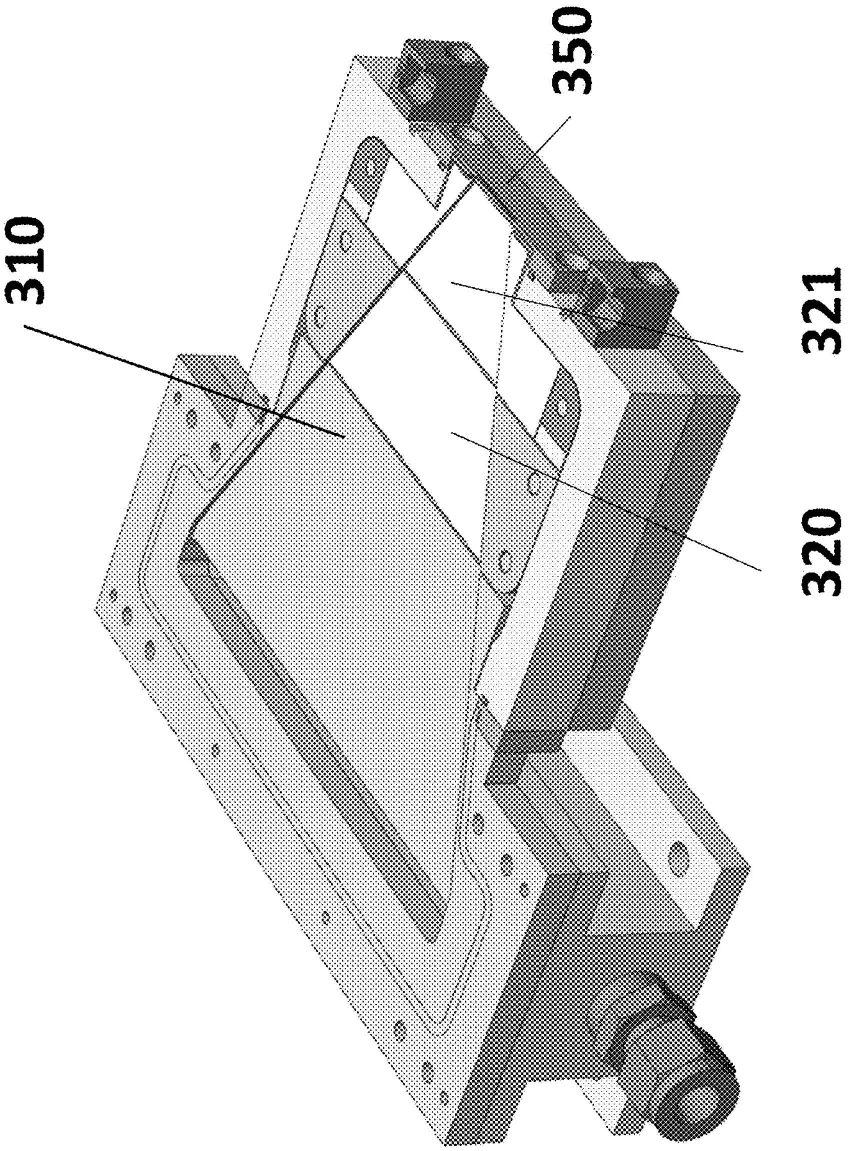
FIG. 3B is a perspective view showing a cross sectional view along line B-B of the extraction growth cell of FIG. 3A.
Figure 3C:
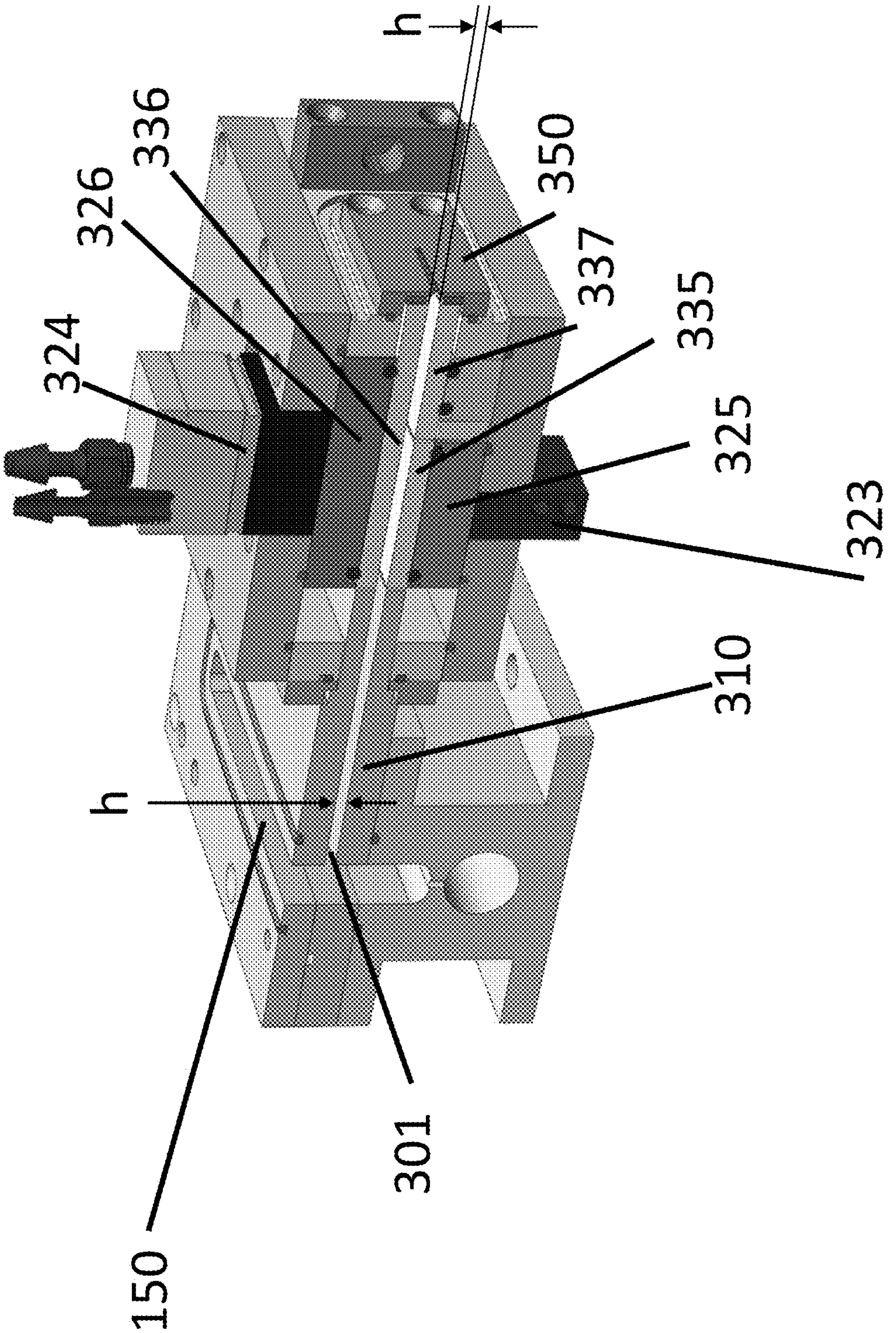
FIG. 3C is a perspective view showing another cross-sectional view along line C-C of the extraction growth cell of FIG. 3A.

An embodiment 300 of the extraction growth cell 120 is illustrated in FIGS. 3A, 3B and 3C. FIG. 3A shows a chamber 250 configured to accept flow from the separator region of the mobility separator 200, a port 251 to through which the excess flow 105 is discharged, and the placement of the extraction growth cell 300. FIG. 3B and FIG. 3C are a cross-sectional views along lines B-B and C-C, respectively, showing the interior channel 310 of the extraction growth cell. FIG. 3B shows the converging channel 310 with condensational growth region 320, vapor recovery section 321 and exit 350. In one embodiment, the converging channel is 120 mm wide at its entrance, narrowing to a 15 mm wide slit at its exit. The overall length is 120 mm. The exit slit component 350 provides additional focusing and is optional. FIG. 3C shows the coupling of the chamber 150 through a 2 mm high extraction slit 301. In the condensational growth region 320 and the vapor recovery section 321, the walls are formed by wicks 335, 336, and 337. The wicks are water saturated porous material, such as may be formed from partially-fired alumina bisque. The wick 335 is mounted to the thermally conductive block 325 which is heated by means of heater block 323. The wicks 336 and 337 are cooled by means of Peltier device 324, coupled thermally by mounting components 326.

The extraction growth cell performs three functions. First, it focuses the flow through a converging channel so that the area that must be imaged is much smaller, thereby reducing the size of the optical system required. Second, it provides condensational growth. Finally, it removes excess water vapor after to prevent condensation on downstream optical components.

To design the focusing aspect, flow trajectories for various convergence angles and geometries were examined using COMSOL Multiphysics® simulations. These numerical studies showed that a convergence half angle of 25° maintains the laminar flow trajectories. These studies also showed that a simple converging geometry, without any straight sections, was better at maintaining the laminar flow trajectories. Based on these calculations, in embodiments, an extraction growth cell includes a channel that converges from a width of 120 mm at the inlet to 15 mm at the exit. The channel height h is 2 mm throughout.

A general consideration in the design of the condensational growth region is that for small particles, condensational growth requires creation of supersaturated conditions, that is regions of more than 100% relative humidity. For small particles, the underlying physics dictates that simple saturation is not sufficient to initiate condensational growth because the equilibrium vapor pressure above the curved surface is higher than over a flat surface of the same chemical composition. This is due to the surface energy, a phenomenon described by the Kelvin relation. The level of required supersaturation increases as the inverse of the particle diameter, so that higher supersaturation values are required for smaller particles. The relative humidity needed to activate the condensational growth of a 6 nm particle is in the range of 140%, depending on particle chemical composition.

Super-saturated conditions are inherently a non-equilibrium state. The flow at walls of the bounding container cannot be supersaturated as any excess water vapor will simply deposit. However, it is possible to create supersaturated conditions within the core of the flow, or in the core of a confined volume. One method of achieving this is through differential rates of heat and water diffusion in a laminar flow. Laminar flow approaches have the advantage that the particles maintain their relative positions during the condensational growth process.

For convection-diffusion in a parallel plate configuration, the saturation profiles depend on the Peclet number, $Qh/(AD)$, where Q is the volumetric flow rate, h is the narrow separation distance between the plates, A is the surface area of the plate, and D is the diffusivity. With the lower flow rate and the narrow spacing h, the required plate area for condensational growth is small, about 30 $cm^2$ for a flow of 1 L/min. This makes it possible to place the growth section at the end of the converging channel, without adding to the overall length of the device.

Although several condensational approaches are possible, the approach used for the extraction growth cell 300 is a convective diffusion cell. This is a single-stage system in which opposing sides of the chamber are held at different temperatures. This produces a sustained section of supersaturation, allowing sufficient droplet growth, and is mechanically practical. The wet-walled section, placed at the end of the converging channel, is formed by parallel sheets of bisque-fired alumina, a rigid porous material. As illustrated in FIGS. 2A and 2B, this consists of a growth section followed by a vapor recovery section. The growth section 320 has warm, water-saturated surface 335 on one side, and a cold surface 336 on the opposite side. In this embodiment the warmed wick is heated by means of a heater mounted in block 323, and the cooled wick is cooled by means of a Peltier device 324 coupled to a liquid cooled block. The temperature difference between the two sides determines the lowest value of the Kelvin diameter, and hence, minimum particle activation diameter. The length of the wet-walled section affects the extent of droplet growth. The vapor recovery section 321 has cooled surfaces on both sides, formed by the extension of cooled wick 336 and a separate wick 337. This configuration serves to lower the dew point to prevent condensation on downstream components while also maintaining supersaturated conditions that allow further droplet growth.

The growth section 320 is followed by a water vapor recovery section 321 in which walls on both sides of the channel are cooler than the warmed section of 320. These cooler walls scavenge water vapor from the air stream, while also cooling the flow. This maintains supersaturated conditions, and hence allows for further condensational growth, while reducing the probability of condensation on downstream components.

Details of the design of the condensational growth region 320 were guided by simulations done using the COMSOL Multiphysics® finite element modeling package. Model calculations were done for the geometry of FIG. 3, wherein the extraction slit is 120 mm long at the entrance, and converges to 25 mm over a length of 115 mm, and the flow rate of air through the cell is 1 L/min.

Figure 4A:
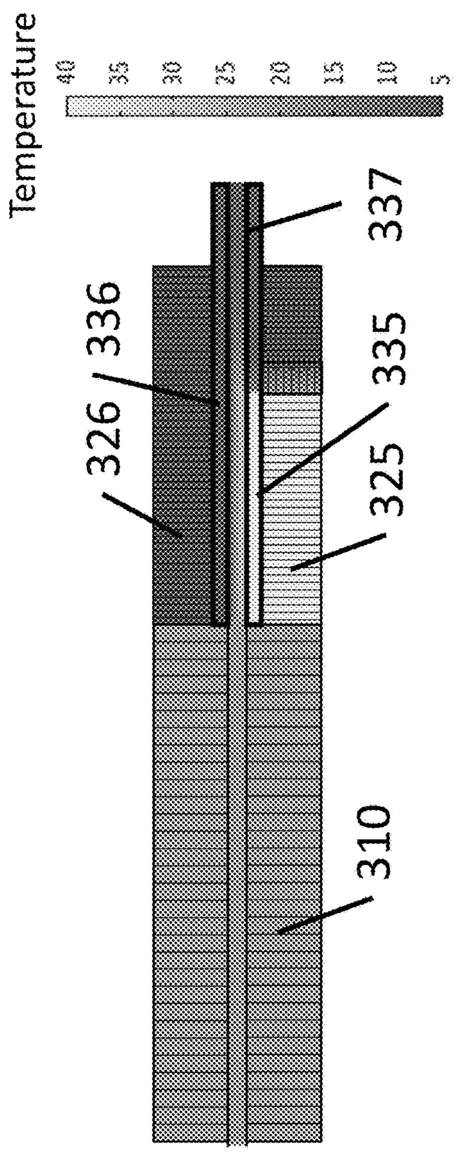
FIG. 4A is a partial cross-sectional view along line C-C of interior components of the extraction growth cell in close proximity to the flow channel, onto which the temperature of each component is superimposed, wherein darker colors indicate colder temperatures.
Figure 4B:
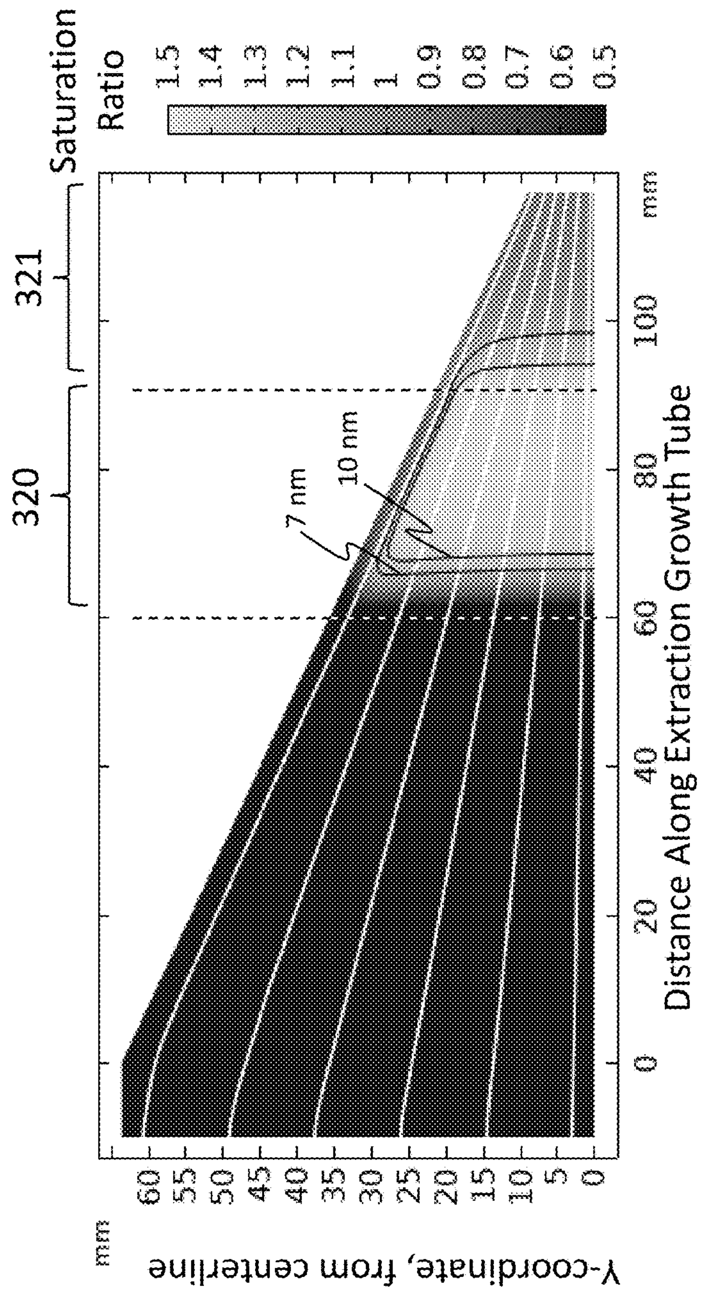
FIG. 4B is a graph of the modeled flow streamlines (white lines), saturation ratio (gray-scale) and Kelvin diameters (black contours) for the extraction growth cell when operated at temperatures of 5° C. and 40° C. for the hot and cold sides respectively of the growth cell.

FIG. 4A shows the calculated temperature profiles within the wicks 335, 336 and 337 when the block 325 is heated to 40° C. and the block 326 is cooled to 5° C. FIG. 4B shows the calculated flow streamlines by the white lines, saturation ratio (grayscale) and Kelvin diameters (black contours). For the convergence angle of 25°, the streamlines converge without disrupting the relative positioning of the flow trajectories. The saturation profiles indicated by the gray scale, where a saturation ratio of 1.4 indicates a relative humidity of 140%. This region of vapor supersaturation occurs in the core of the flow, away from the walls, and is the result of the transport of water vapor from the warm wick 335 into the colder flow. The black contours show that particles of 7 nm are activated across the majority of the extraction flow channel, and thus will be enlarged to form droplets that can be imaged by the imaging system.

Figure 5A:
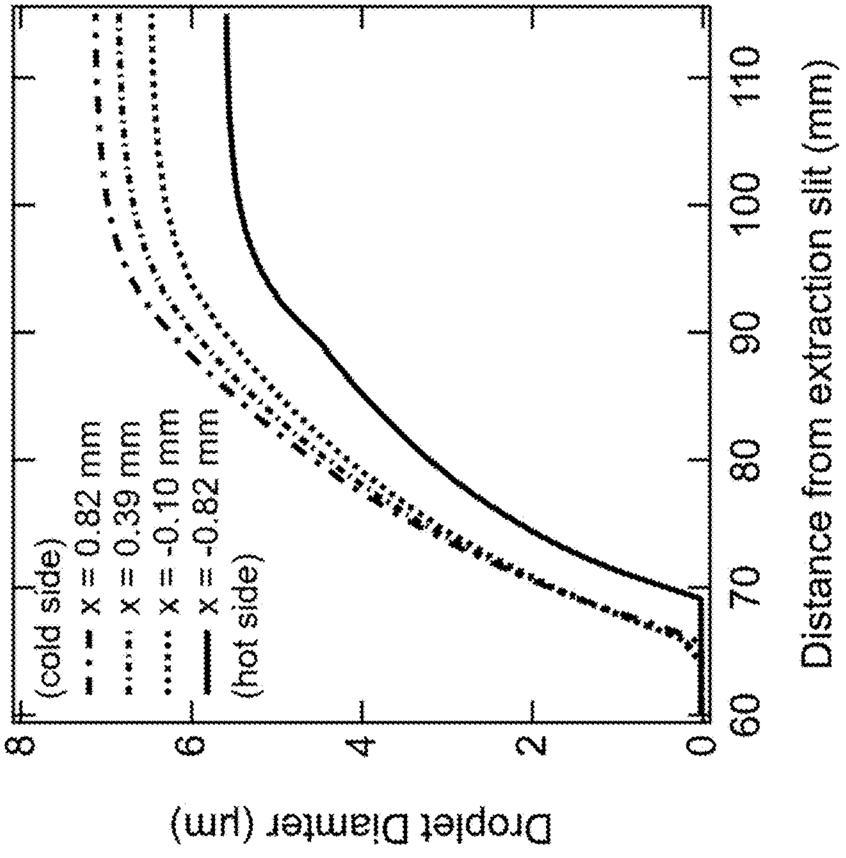
FIG. 5A is a graph of the calculated droplet growth along four different flow trajectories within a growth region of the growth cell that is 30 mm long and is operated at temperatures of 5° C. and 40° C. for the hot and cold sides respectively.
Figure 5B:
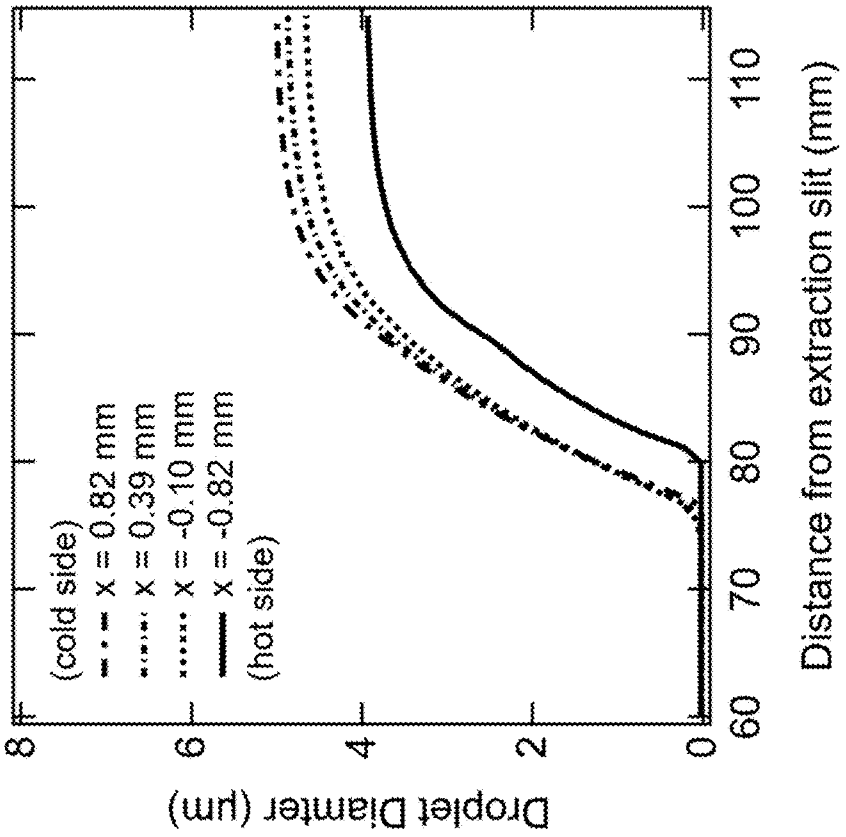
FIG. 5B is a graph of the calculated droplet growth along four different flow trajectories within the growth region of the growth cell under the same conditions as FIG. 5A, but with a growth region that is 20 mm long.

FIG. 5A shows droplet growth along flow trajectories spanning the height h of the extraction growth cell channel for configuration modeled in FIGS. 4A and 4B. Here the growth region 320 starts at a distance from the extraction slit of 60 mm, and its length is 30 mm, and the vapor recovery region 321 is also 30 mm in length. The channel height h is 2 mm. The flow rate is 1 L/min, and the warm and cold temperature settings are 40° and 5° C. FIG. 5B shows the same calculation for a shorter growth region that is 20 mm in length. In both cases the droplet size is maintained throughout the vapor recovery section. The spread in growth along each trajectory corresponds to different starting positions across the 2 mm height h of the extraction growth cell channel. For longer growth sections the droplet growth starts sooner and reaches larger diameters. Particles along the cold wall activate later, and do not get quite as large. While larger droplets are more readily imaged, they are also subject to transport losses. Taking both factors into account, coupled with modeling of the transport, led us to select the intermediate length of those shown.

An integrated AMI system was built in accordance with the mechanical drawings of FIG. 2 and FIG. 3 and tested. The interior channel 220 of the mobility separator measures 330 mm in length (z-coordinate), 127 mm in width (y-coordinate) with a separation between the plates (x-coordinate) of 9 mm. Its high voltage electrode consists of 60 parallel traces on a printed circuit board, each 0.15 mm wide, 190 mm long, and distributed with 1.0 mm period. Its extraction growth cell used a 30 mm long growth region 320, followed by a 30 mm long vapor recovery section 321. The system was operated at a sheath flow of 4 L/min, an aerosol sample flow of 1 L/min, equal to the aerosol extraction flow. The setpoint temperatures in the wet walled section of the extraction growth cell were 5° C. and 40° C.

Figure 6:
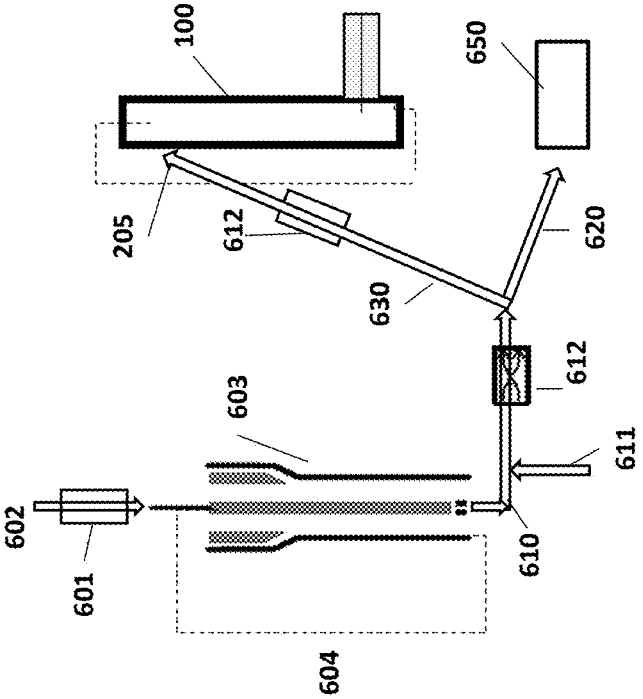
FIG. 6 is schematic of the experimental configuration used for laboratory testing to measure the particle size response of an integrated aerosol mobility imaging system.

Laboratory testing of the integrated AMI system was done using aerosol of uniform electrical mobility, illustrated schematically in FIG. 6. A flow 602 containing polydisperse aerosol was generated by atomization. For the smallest particles, at 10 nm-20 nm, the atomized aerosol was directed through a tube furnace to increase abundance of small particles via evaporation and nucleation. A mono-mobility fraction of the generated polydisperse aerosol was obtained by passing the 602 aerosol through a bipolar ion source 601 and through commercial differential mobility analyzer 603. The output in flow 610 contains particles of nearly uniform in electrical mobility, wherein the mean mobility is selected by the operating flows and voltage of the analyzer 603. For size selection between 50 nm to 200 nm a long column differential mobility analyzer was used. For the size range from 10 nm to 50 nm a short column differential mobility analyzer was used. For most experiments overlapping data were obtained between 30-50 nm. These differential mobility analyzers were operated with a 10:1 sheath to aerosol ratio to give a non-diffusive size resolution of 10. The output mono-mobility aerosol flow was diluted with a flow of dry, filtered air 611, passed through a mixer 612, split into two equal flows 620 and 630 of 1 L/min, and then distributed to a condensation particle counter 650 and the aerosol inlet 205 of the AMI 100. The aerosol flow into the AMI was metered by means of a laminar flow meter 612, while the condensation particle counterflow was controlled by a critical orifice. The sheath and excess flows of AMI separator are controlled by a blower (not illustrated) in a loop.

Figure 7:
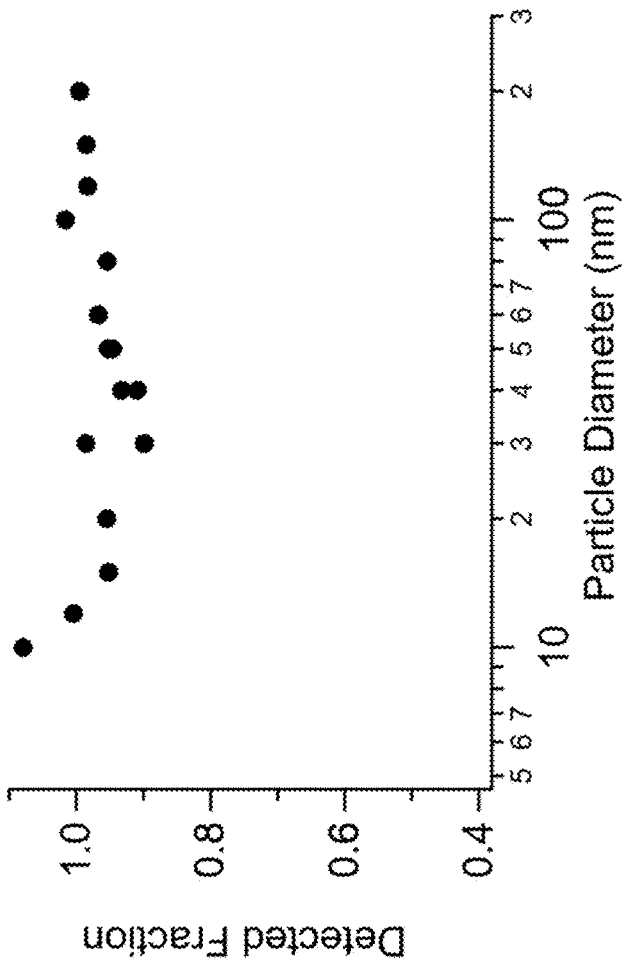
FIG. 7 is a graph of the fraction of aerosol detected as a function of particle size and reflects the combined extraction cell transmission and droplet detection efficiencies.

The combined efficiency for particle transport through the extraction growth cell 120, and optical imaging system 130 was measured for particle sizes from 10 nm to 200 nm in diameter. This was done using the setup of FIG. 6, but with the AMI sheath flow turned off and high voltage electrode set to ground potential. The entire flow 1 L/min aerosol flow input to the separator 110 was directed through the extraction growth cell, and the particle count compared to the concentration indicated by the upstream condensation particle counter. Essentially, the separator 110 acted as simple flow channel that delivered aerosol to the inlet of the extraction growth cell. Results are shown in FIG. 7. For mono-mobility input aerosol ranging from 10 nm to 200 nm the combined efficiency for extraction growth cell transmission and droplet detection is near 1. These data confirm that the extraction growth cell efficiently transports the particles while providing sufficient condensational growth for easy detection.

Figure 8:
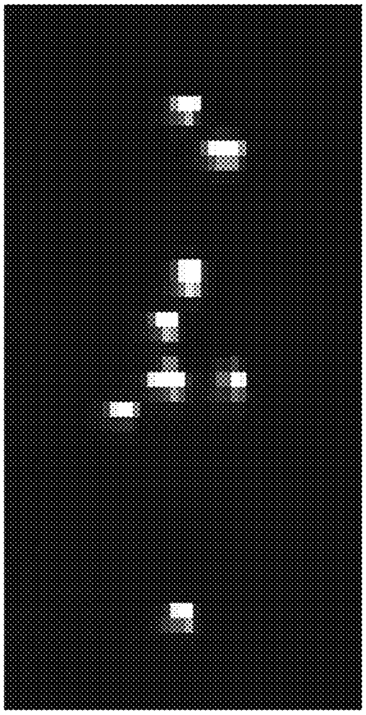
FIG. 8 is a portion of an image captured by a photodetector array resulting from the introduction of 20 nm particles that have passed through the mobility separator and extraction growth cell.
Figure 9:
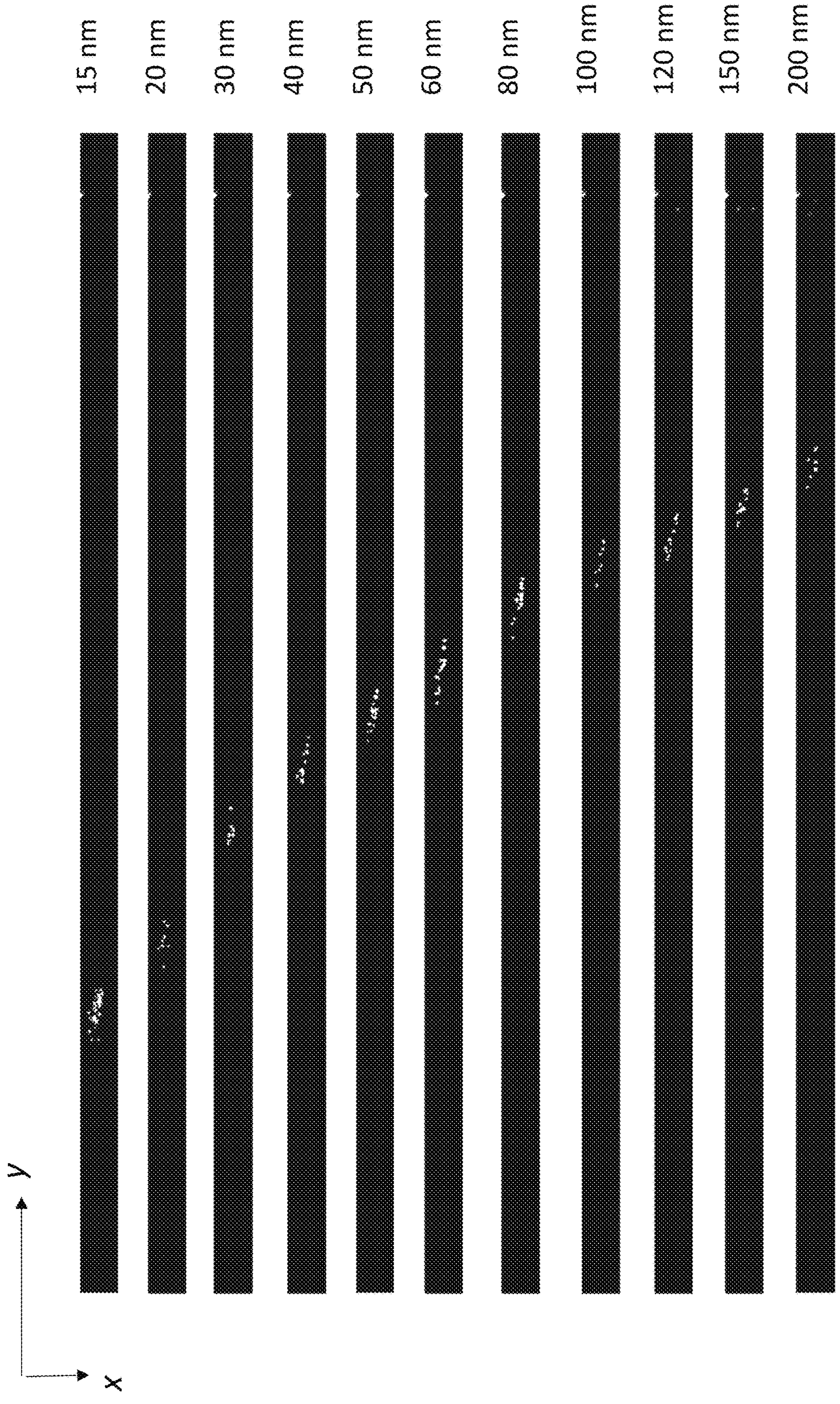
FIG. 9 is a series of images captured at the exit of the extraction growth cell for eleven different particle sizes.

To test whether the particles maintain their size-dependent spatial separation during the extraction and growth process, the system was tested using mono-mobility aerosol with the setup of FIG. 6. FIG. 8 presents a single image captured from an input aerosol at 20 nm. It clearly shows distinguishable particles. A series of images obtained for tests at varying input sizes is shown in FIG. 9. The shift in position with the input particle size is clear, indicating that the particles do maintain their relative positions as required. Interestingly, there is a slight tilt to the images, with particles nearest the bottom of the channel, shifted towards larger particle sizes. These particles were extracted at the bottom of the separation slit, and hence have a slightly longer transport time and therefore larger particle diameter. It suggests that not only have the positions of the particles along the length of the slit been maintained, but also that there may be information to be gleaned from the relative position in the in the height (x-dimension) of the nozzle slit.

Figure 10:
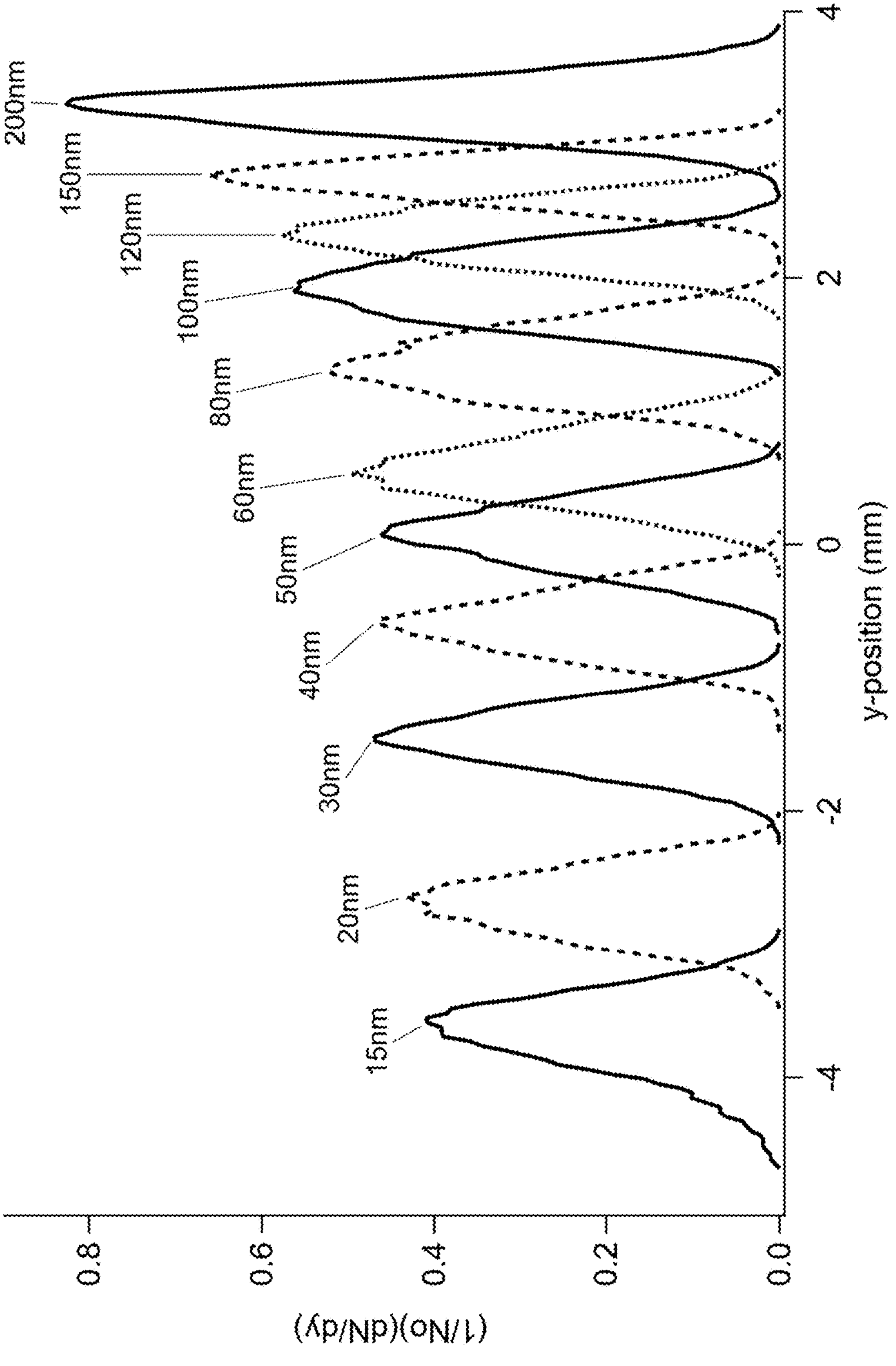
FIG. 10 is a graph of response curves for eleven different particle sizes wherein the data are expressed as a number concentration per unit slit width normalized with respect to an upstream particle concentration measured by a condensation particle counter.

FIG. 10 shows the results from these laboratory experiments, wherein the concentrations measured by AMI are normalized by the upstream concentration measured by the condensation particle counter. The AMI concentrations are calculated from histograms of the number of particles as a function of y-position along the length of the slit. This y-coordinate is the distance along the length of the 15 mm exit slit and varies from roughly −4 to +4 mm from the center of the slit. From the histogram data, one can calculate the normalized distribution $(1/N_0)$ dN/dy where $N_0$ is the number concentration measured by the upstream condensation particle counter, and dN is derived from the histogram of counts C per unit slit width y, dC/dy, the volumetric flow rate (Q=1 L/min), the slit length (15 mm) and the measurement interval dt: dN=dC/dy (L/Q). These data show readily distinguishable peaks with no evidence of tailing outside a defined range in y-positions. Over the majority of the range shown (y=−4 mm to +2 mm), the separator voltage varies logarithmically with y-position. This provides nicely distributed, consistent response functions.

Figure 11:
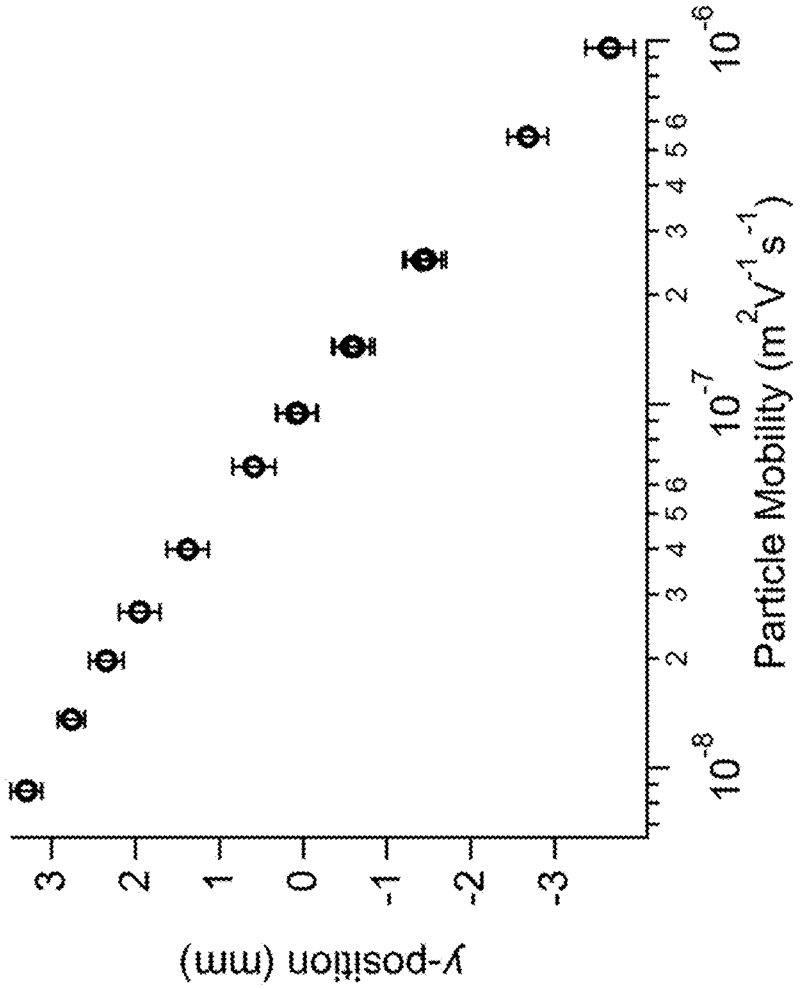
FIG. 11 is a graph of the y-coordinate position corresponding the peak response at each particle size, plotted as a function of the logarithm of the particle mobility.

FIG. 11 plots the position of the peak response at each particle size as a function of the particle mobility. The AMI system was designed with a logarithmic varying voltage in its central region, hence the dependence of position of the logarithm of particle mobility, as shown by this data, is as expected. The error bars represent one standard deviation.

Figure 12:
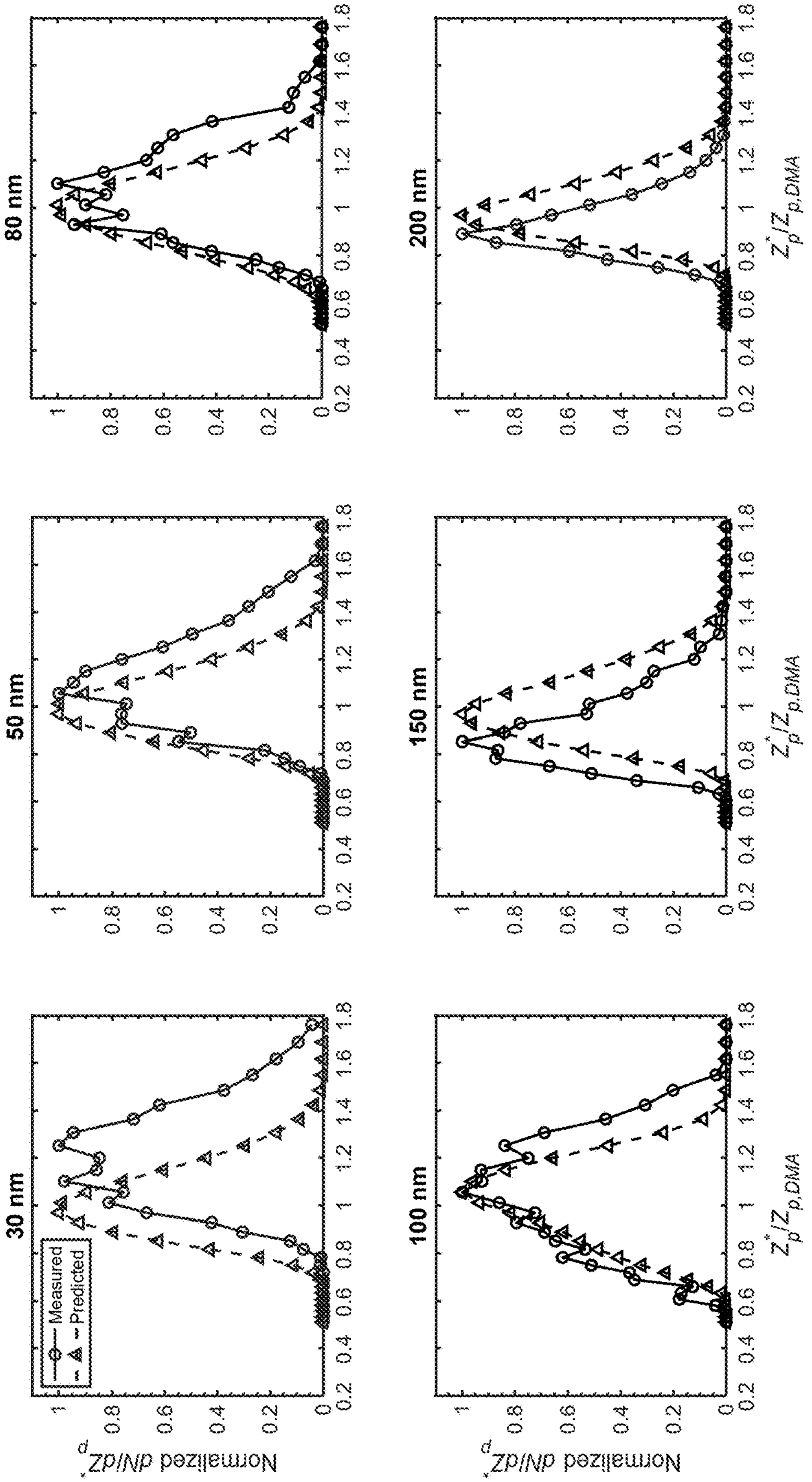
FIG. 12 are graphs comparing the measured response (circles) to 2-dimensional model calculations (boxes) for six particle sizes from 30 nm to 200 nm that were selected with differential mobility analyzer operated at resolution of 10.

FIG. 12 compares experimental data to calculation based on modeling of the complete system obtained using a two-dimensional model of the electric field within the separator. The model assumes no variation along the z-coordinate (in the direction of flow within the separator). It does not account for edge effects, which could be important at the end of the separator, just ahead of particle extraction. The data are normalized with respect to the peak in the response. It takes into account the spread in particle mobilities in the test aerosol. The measured response tends to be slightly broader than this theoretical value, with a slight shift in the mean particle position, with the smallest and the largest particles appearing closer to the center than predicted.

The model calculations of FIG. 12 are obtained by simulating the trajectories of the particles inside the AMI. Calculations were performed using the finite element analysis software package COMSOL Multiphysics®. Inside the AMI separator, the flow is assumed as fully-developed 1-D flow in the z-direction only, and the flow velocity is independent of y and z coordinates. Such an assumption is reasonable as the particles in the vicinity of the sidewalls of the separator are not measured. Referencing FIG. 1, the electrical field inside the AMI separator is assumed to vary with x and y only, and edge effects of electric field, i.e., the non-ideality near the end of the electrode are neglected. Inside the extraction growth cell the model calculated the three-dimensional flow field. The flow profile at the entrance of the extraction growth cell is fully developed. Based on the flow and electric fields inside the separator and the three-dimensional flow field in the extraction growth cell, the trajectories of particles introduced into the AMI are simulated using the Langevin equation.

To facilitate the analysis of AMI performance and the comparison of simulation results with measurements, an instrument response mobility is defined following a similar approach employed previously. Instrument response mobility is defined based on the trajectories of singly charged, non-diffusing particles introduced into the separator along the central aerosol flow streamline. The non-diffusing particles are introduced at 1000 initial y positions $y_{input}$ evenly spaced from −50 and 50 mm across the separator. At each $y_{input}$ position, particles of 2500 different diameters logarithmically distributed from 5 nm to 500 nm are introduced. The motion of particles within the separator and extraction growth cell is simulated using the Langevin equation with the one-dimensional flow and two-dimensional electric fields inside the separator and the three-dimensional flow field in the extraction growth cell.

Figure 13:
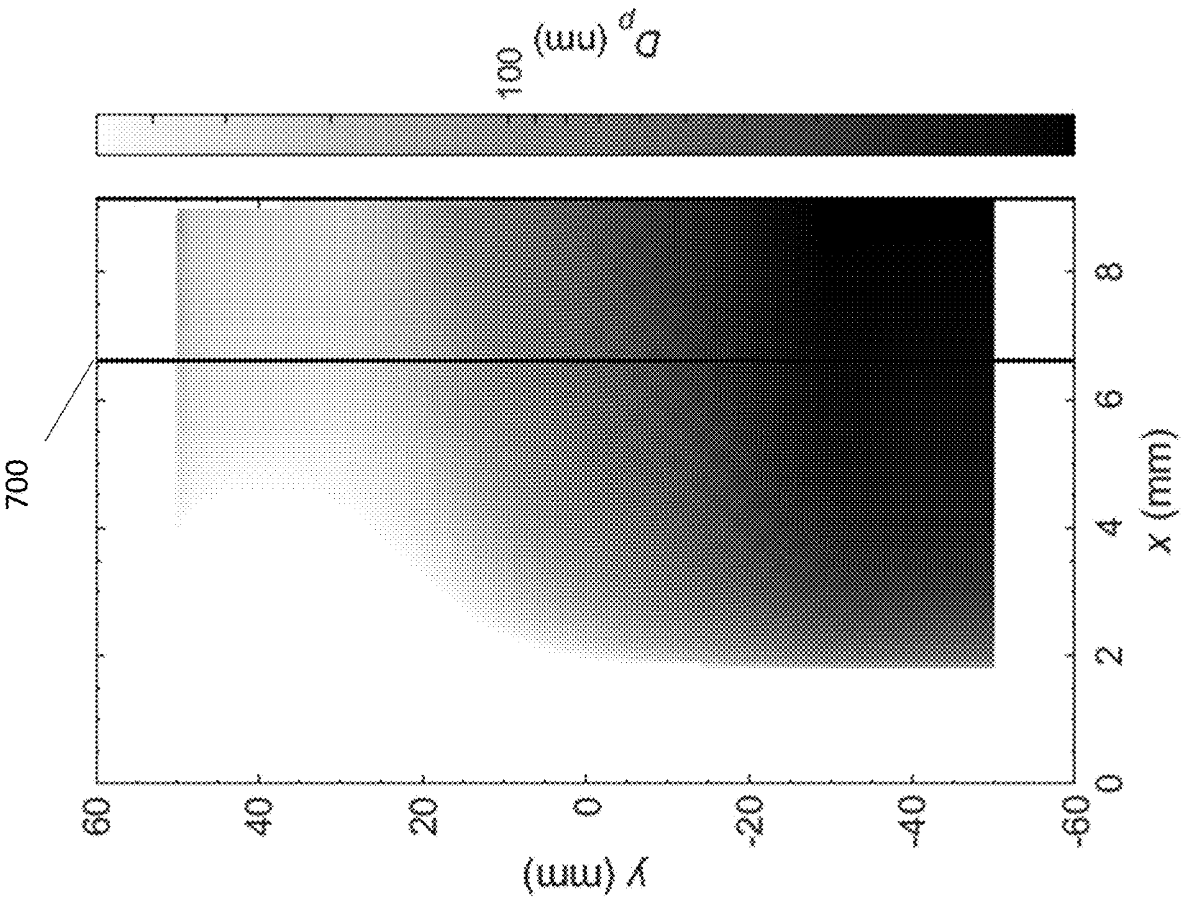
FIG. 13 is a graph showing the simulated position at the exit of the separator for non-diffusing particles of various indicated diameters introduced evenly across the particle sample inlet to the separator wherein the flow to the right of the line 700 is directed into the extraction growth cell.
Figure 14:
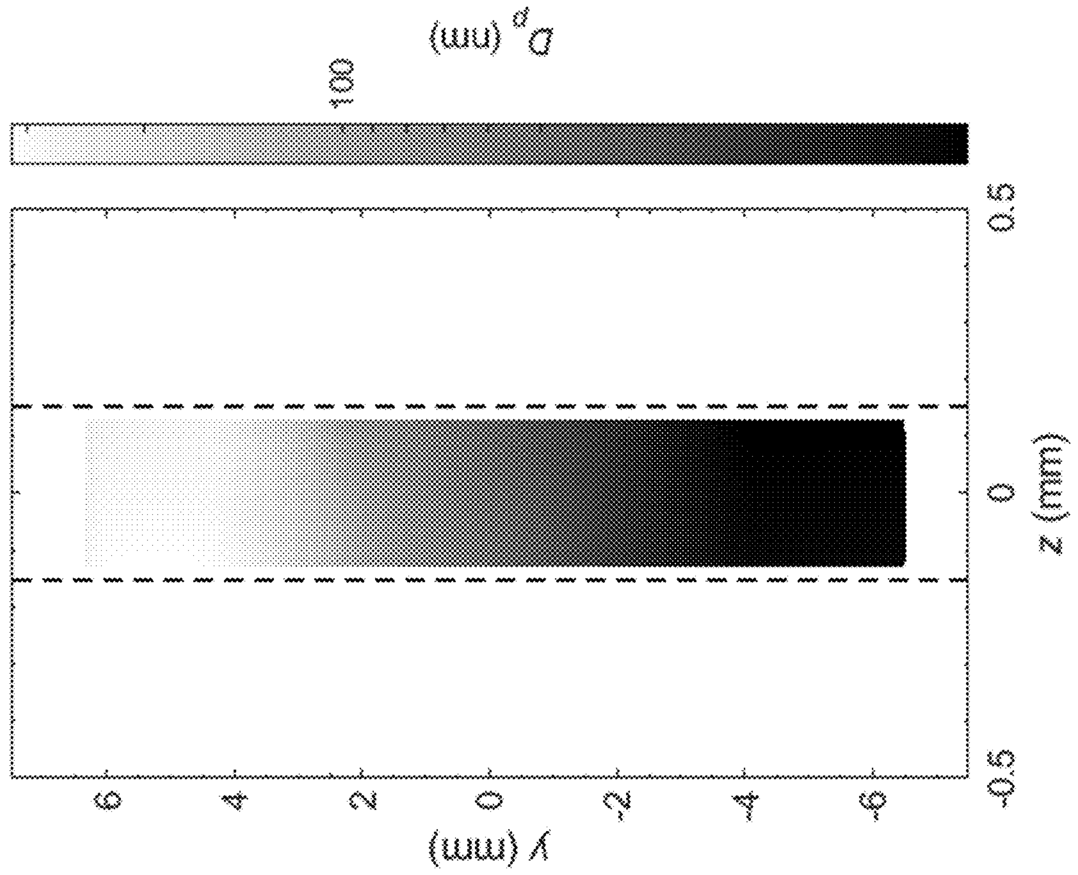
FIG. 14 is a graph showing the simulated position at the exit nozzle of the extraction growth cell for non-diffusing particles of various diameters introduced evenly across the particle sample inlet to the separator.

FIG. 13 shows the x-y positions of those non-diffusing particles at the separator exit. FIG. 14 shows the particle positions at the focusing slit 350. Particle diameter is indicated by the shade darkness relative to the x and y axis. The region from which the flow is extracted at the separator exit is to the right of the black line 700 (i.e., 6.6 mm<x<9.1 mm, FIG. 13). The boundary of this region is determined by integrating the flow velocity to match the extracted flowrate (i.e., 1 LPM), assuming a fully-developed parabolic flow profile at the separator exit. Given the increasing electric field strength with the y coordinate, the extracted particles of different sizes are spatially separated largely based on their y position. The final particle position at the exit of the focusing nozzle slit (i.e., after the growth cell, in x-y plane) are shown in FIG. 14. The simulation shows that particles extracted into the growth cell maintain their relative y position during the convergence and focusing of the flow. The particle diameter largely depends on the y coordinate, albeit exhibiting a weak dependence on the z coordinate.

Figure 15B:
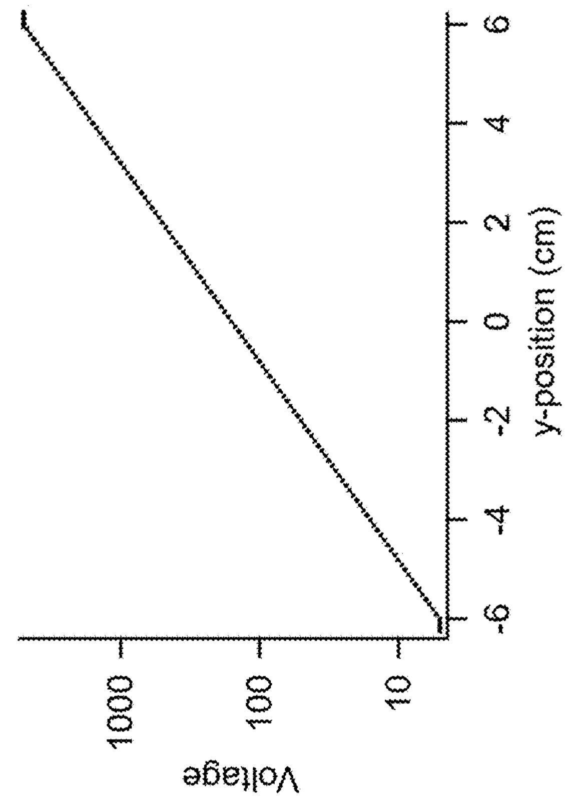
FIG. 15B is a graph of the logarithm of the voltages applied to the traces along the width of separator used for measurement for a unipolar spatially-varying high voltage fields.
Figure 15A:
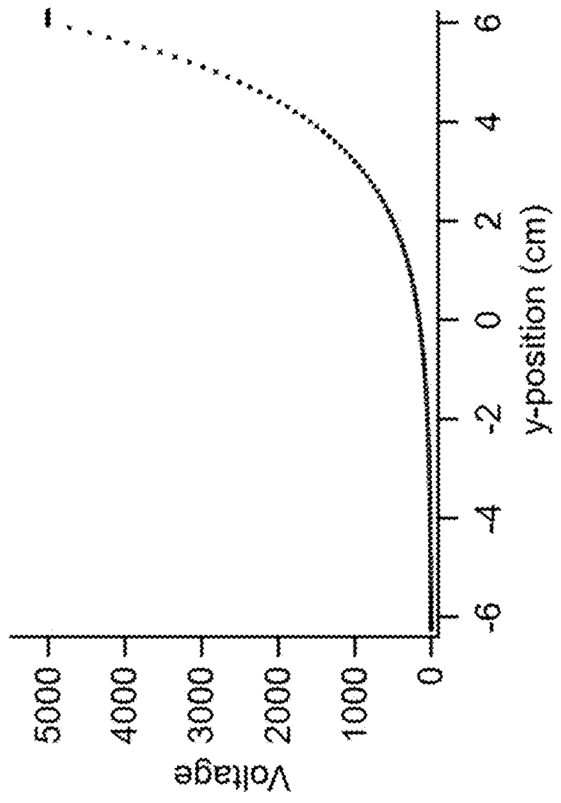
FIG. 15A is a graph of the voltages applied to the traces along the width of separator used for measurement for a unipolar spatially-varying high voltage fields.

Although only one configuration of the high voltage electrode of the mobility separator was tested, various designs are possible. The high voltage electrode consists of multiple parallel traces, extending along the z-direction of FIG. 1. By using printed circuit board techniques, it is possible to have approximately 100 such traces over a distance of 120 mm, each separated by about 1 mm. FIG. 15A illustrates the voltage relative to the y-axis position for a unipolar electrode design, wherein each point shows the voltage applied to an individual trace. In this unipolar design the applied voltages increase exponentially as function of y-position of the trace. Correspondingly, the logarithm of the voltage increases linearly from log (5 volts) to log (5000 volts), as shown in FIG. 15B. At the extremes, the respective voltages of 5V and 5000V is constant over short distance of a few millimeters.

For studies where the electrical charging efficiency is uncertain, it is useful to have bipolar mobility measurements, that is to measure the number concentration for both positively and negatively charged particles. Electrical mobility-based measurements of aerosol size distribution require the knowledge of particle charge distribution. In a bipolar diffusion charger, aerosols reach stationary charge states when the product of ion concentration and residence time is sufficiently high. However, these states (charge distribution) are influenced by ion properties, including mass, mobility, and concentration, and can vary with measurement conditions. These variations can lead to uncertainties in positive and negative charge fractions, and thus the derived aerosol size distribution. It has been shown that the uncertainties caused by aerosol charging state can be minimized when measurements of both positively and negatively charged particles (rather than measurements of particles of only a single polarity, as is done conventionally) are used to derive aerosol size distribution.

Figure 16A:
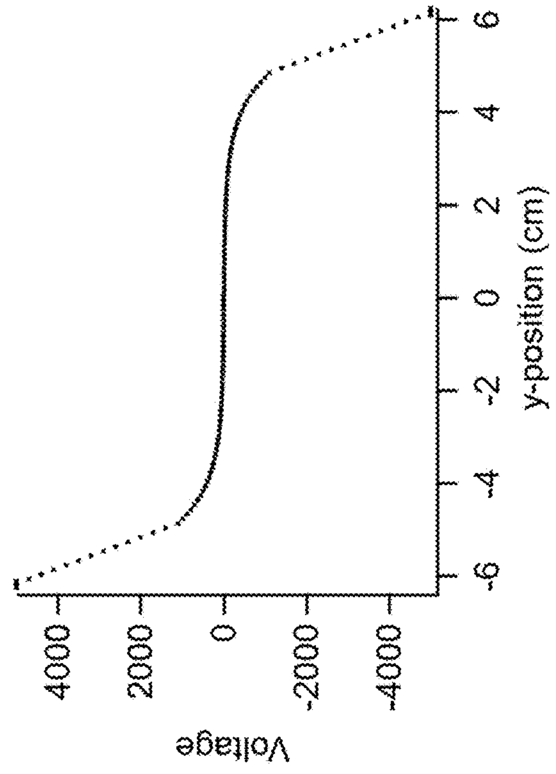
FIG. 16A is a graph of the voltages applied to the traces along the width of separator used for measurement for a bipolar spatially-varying high voltage fields.
Figure 16B:
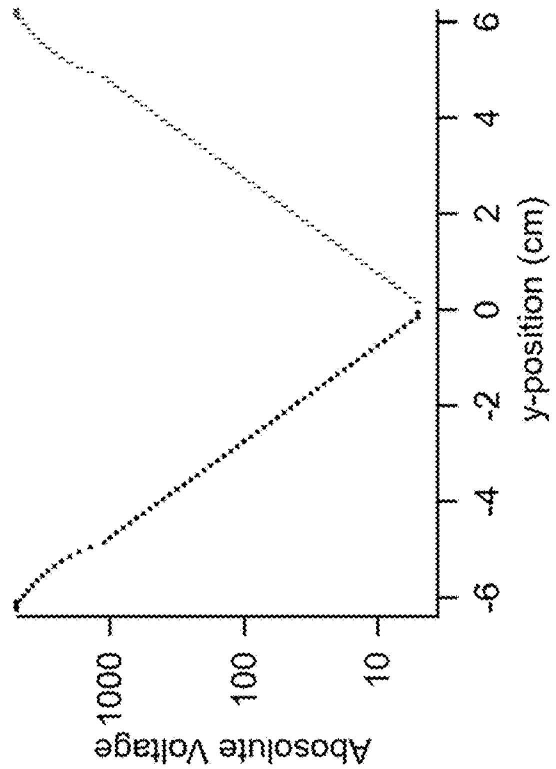
FIG. 16B is a graph of the logarithm of the absolute value of the voltages applied to the traces along the width of separator used for measurement for a bipolar spatially-varying high voltage field.

FIG. 16A illustrates the voltage relative to the y-axis position for an electrode configured to provide bipolar mobility separation, with simultaneous measurement of positively and negatively charged particles. In this configuration the voltage varies along the width of separator from −5000 to −5 volt, then from 5 to 5000 volts. Voltages vary exponentially with y where possible, but transition to linear dependence at higher absolute values of the voltage to prevent arcing between neighboring traces. For the configuration of FIG. 16A, FIG. 16B plots the absolute value of the voltages, on a logarithmic scale, for the individual traces.

Figure 17:
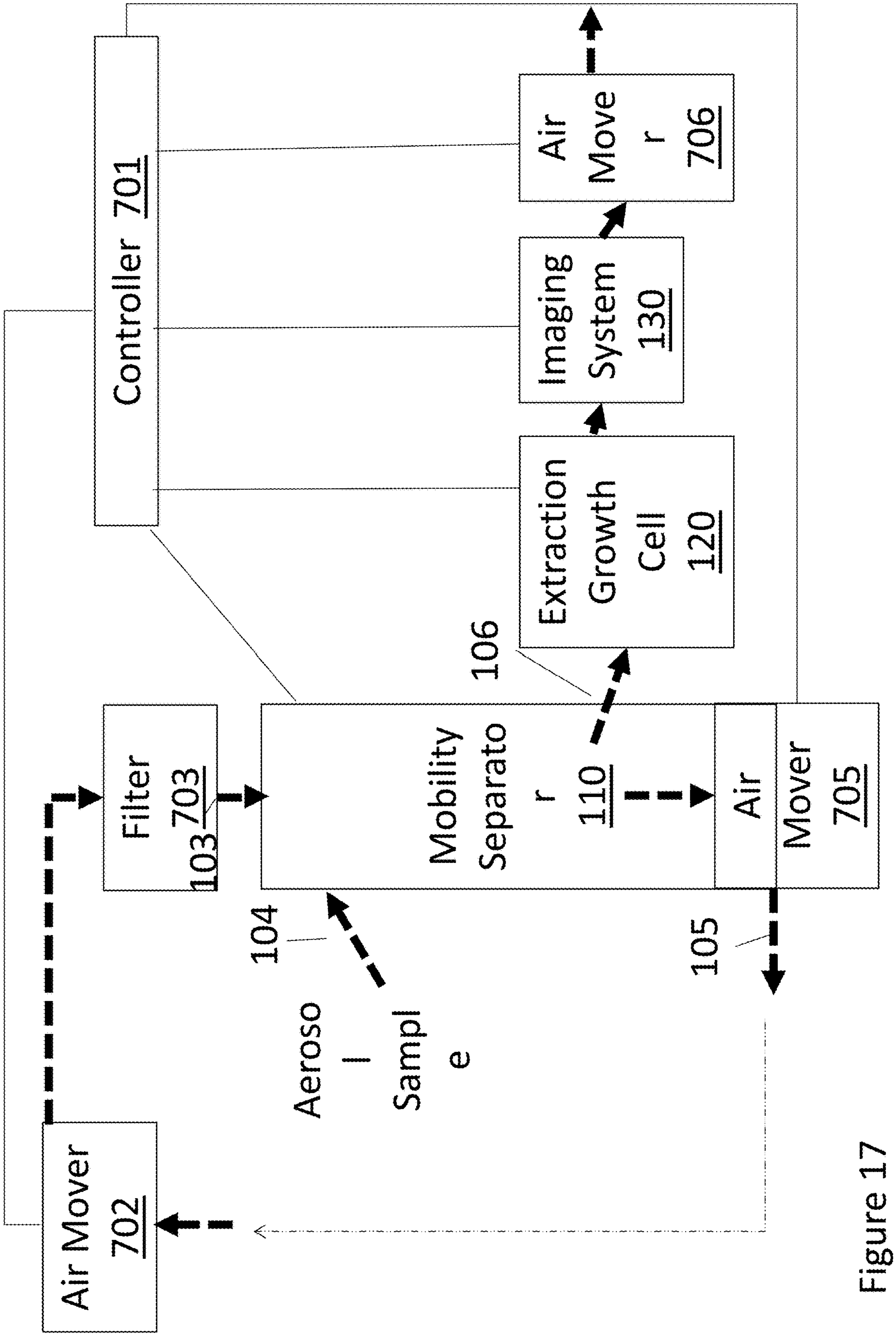
FIG. 17 is a block diagram of the system components coupled to a controller.

FIG. 17 illustrates the operation of the aerosol mobility imaging system by a controller 701, which may be a general purpose processor, a special purpose processor or a programmable circuit executing code adapted to cause the controller to perform the methods herein by controlling the various elements described herein, including control of the flows, setting of voltages in the separator, controlling the temperatures within the extraction growth cell, setting the laser, and capturing images. The aerosol mobility imaging system has four flows: aerosol sample flow input 104, particle free sheath flow input 103, the extracted aerosol flow output 105, and the remaining, excess flow output 106. In one embodiment, three of the flows are controlled by the controller 701, and the fourth flow is obtained by a difference calculation. For example, the controller may control the air movers 702, 705 and 706 to separately fix the sheath flow input, the excess flow output and the extracted aerosol flow output. In another configuration, the excess flow output 105 is connected to the sheath flow input 103, bypassing air mover 705 and passing through air mover 702 and filter 703. In this configuration, the controller the sheath flow input and the excess flow output are equal in magnitude, and the controller needs only to control this flow and either the sampled aerosol flow or the extracted aerosol flow output. In one embodiment, the controller is a microprocessor with a custom firmware program. The controller may further control the imaging system and output images for later data processing, or may report the counts, position and mobility of the imaged particles to an output device (monitor, memory device, printer, or any output device) to report the aerosol size distribution. The controller may output a data output stream for transmitting data to fixed or removable external storage for later analysis. Elements of the aerosol mobility system may include additional circuitry such as circuitry to control the laser, circuitry to operate the photodiode or CCD (charge coupled device) array and process its output prior to input to the controller.

Embodiments disclosed herein provide, in one general aspect, a method to measure a size distribution of particles based on their electrical mobility. The method includes: introducing, via a sheath flow inlet, a particle free sheath flow into a chamber formed by two parallel walls which are separated by a gap, the chamber having a width and a length, the sheath flow having a direction along the length of the chamber and flowing in a laminar manner; introducing an aerosol sample flow into the chamber downstream of the sheath inlet such that the aerosol sample flow joins the particle free sheath flow in a laminar manner; applying an electric field between the two parallel walls of the chamber, the field having a strength which varies across the width of the chamber; extracting an output aerosol flow through a first outlet downstream of the sample inlet; and outputting an excess flow equal to a sum of the sheath flow and aerosol sample flow minus the output aerosol flow. The method may also include: passing the output aerosol flow through a growth cell in a laminar manner, the growth cell having a region of wetted walls with two or more temperature regions such that the particles within the output aerosol flow grow by condensation to form droplets, and such that relative positions of droplets are indicative of particle electrical mobility; and counting and capturing a spatial position of individual droplets exiting the growth cell.

Implementations may include the aforementioned method further including creating an image of the individual droplets and mapping of the position of the droplets that are imaged onto the electrical mobility of particle at the sample inlet. Implementations may include any of the aforementioned methods wherein the mapping of the position of the droplets that are imaged onto the electrical mobility of the particles at the sample inlet is accomplished through calibration with particles of known electrical mobility. Implementations may include any of the aforementioned methods wherein the mapping of the position of the droplets that are imaged onto the electrical mobility of particles at the sample inlet is accomplished through model calculations of the flow and electric fields. Implementations may include any of the aforementioned methods wherein the excess flow is recirculated through an air mover and filter and reintroduced at the sheath flow inlet. Implementations may include any of the aforementioned methods wherein the method further includes calculating a distribution in particle electrical mobilities based on the counting and mapping, and based on a distribution in electrical mobility and an electrical charge distribution of the aerosol at the sample inlet. Implementations may include any of the aforementioned methods the method further includes passing the aerosol sample flow through a bipolar ion source prior to introduction at the sample inlet. Implementations may include any of the aforementioned methods wherein the electrical field is applied by actuating a voltage on a plurality of conductive traces on a printed circuit board, such traces extending in straight lines along a portion of the length of the chamber. Implementations may include any of the aforementioned methods the actuating of the voltage may include increasing the voltage applied to at least a portion of the plurality of conductive traces exponentially with trace position across the width of the chamber. Implementations may include any of the aforementioned methods wherein the actuating may include applying the voltage at a first polarity for approximately one-half of the plurality of conductive traces and at an opposite polarity for the other half of the conductive traces.

Implementations may include any of the aforementioned methods wherein a magnitude of the sheath flow is at least three times higher than a magnitude of aerosol sample flow. Implementations may include any of the aforementioned methods wherein a magnitude of the aerosol sample flow and a magnitude of output aerosol flow are equal. Implementations may include any of the aforementioned methods further including controlling relative humidity of the sheath flow. Implementations may include any of the aforementioned methods wherein a charge distribution on the sampled aerosol is inferred through comparison of negative and positive mobility distributions.

Another aspect of the technology includes an aerosol mobility imaging system. The aerosol mobility imaging system also includes a chamber formed by a first wall and a second wall, the first and second walls being parallel and separated by a gap, the chamber having a width and a length. The aerosol mobility imaging system also includes a sheath flow inlet to the chamber, the sheath flow inlet configured to receive a particle free sheath flow; an aerosol sample inlet configured to receive an aerosol sample flow, the sample inlet located in the first wall, downstream of the sheath flow inlet, such that the aerosol sample flow joins the particle free sheath flow in a laminar manner; an electrode configured to provide electric field between the first wall and the second wall, the electric field having a strength which varies across the width of the chamber an aerosol flow extraction outlet provided in the second wall and downstream of the sample inlet; an excess flow outlet downstream of the aerosol flow extraction outlet; a growth cell coupled to the aerosol flow extraction outlet to receive an extracted aerosol flow, the growth cell including a region of wetted walls with two or more temperature regions such that the particles within the extracted aerosol flow grow by condensation to form droplets within the growth cell, the growth cell configured to maintain laminar flow such that relative positions of droplets exiting the growth cell are indicative of particle electrical mobility, the growth cell having an output; and an imaging system coupled to the output of the growth cell, the imaging system configured to count and capture a spatial position of individual droplets as they exit the growth cell. Other embodiments of this aspect include corresponding computer systems, apparatus, and computer programs recorded on one or more computer storage devices, each configured to perform the actions of the methods.

Implementations may include one or more of the following features. The system further including a system controller, the controller including instructions causing a processor to: map a position of the droplets that are imaged onto the electrical mobility of particle at the sample inlet; calculate a distribution in particle electrical mobilities from the count and mapping, where the calculation is based on the distribution in electrical mobilities and an electrical charge distribution of the aerosol at the sample inlet. The system further including a bipolar ion source coupled to the sample inlet and configured to receive the aerosol sample flow prior to the aerosol sample flow passing through the sample inlet. The electrode is formed by multiple traces on a printed circuit board, such traces extending in straight lines along a portion of the length of the chamber. The system where a voltage applied each of at least a portion of the individual traces increases exponentially with position across the width of the chamber. The system where the excess flow outlet is coupled to an air mover and filter, and excess flow exiting the outlet is reintroduced at the sheath flow inlet. Implementations of the described techniques may include hardware, a method or process, or computer software on a computer-accessible medium.

For the purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For the purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations, or equivalents that fall within the scope of the present disclosure.

Certain aspects of the controller and data described in this technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. A computer readable medium or media does (do) not include propagated, modulated, or transitory signals.

Communication media typically embodies computer readable instructions, data structures, program modules or other data in a propagated, modulated, or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to measure a size distribution of particles based on their electrical mobility comprising:

introducing, via a sheath flow inlet, a particle free sheath flow into a chamber formed by two parallel walls which are separated by a gap, the chamber having a width and a length, the sheath flow having a direction along the length of the chamber and flowing a laminar manner;

introducing an aerosol sample flow into the chamber at a sample inlet downstream of the sheath inlet such that the aerosol sample flow joins the particle free sheath flow in a laminar manner;

applying an electric field between the two parallel walls of the chamber, the field having a strength which varies across the width of the chamber;

extracting an output aerosol flow through a first outlet downstream of the sample inlet;

outputting an excess flow equal to a sum of the sheath flow and aerosol sample flow minus the output aerosol flow;

passing the output aerosol flow through a focusing growth cell in a laminar manner, the growth cell having a converging channel and a region of wetted walls with two or more temperature regions such that the particles within the output aerosol flow grow by condensation to form droplets, and such that relative positions of droplets are indicative of particle electrical mobility; and counting and capturing a spatial position of individual droplets exiting the focusing growth cell.

2. The method of claim 1 further including creating an image of the individual droplets and mapping of the position of the droplets that are imaged onto the electrical mobility of particle at the sample inlet.

3. The method of claim 2 wherein the mapping of the position of the droplets that are imaged onto the electrical mobility of particle at the sample inlet is accomplished through calibration with particles of known electrical mobility.

4. The method of claim 2 wherein the mapping of the position of the droplets that are imaged onto the electrical mobility of particle at the sample inlet is accomplished through model calculations of the flow and electric fields.

5. The method of claim 4 wherein the excess flow is recirculated through an air mover and filter and reintroduced at the sheath flow inlet.

6. The method of claim 1 further including calculating a distribution in particle electrical mobilities based on the counting and mapping, and based on a distribution in electrical mobility and an electrical charge distribution of the aerosol at the sample inlet.

7. The method of claim 1 further including passing the aerosol sample flow through a bipolar ion source prior to introduction at the sample inlet.

8. The method of claim 1 wherein the electrical field is applied by actuating a voltage on a plurality of conductive traces on a printed circuit board, such traces extending in straight lines along a portion of the length of the chamber.

9. The method of claim 8 wherein the actuating comprises increasing the voltage applied to at least a portion of the plurality of conductive traces exponentially with trace position across the width of the chamber.

10. The method of claim 8 wherein the actuating comprises applying the voltage at a first polarity for approximately one-half of the plurality of conductive traces and at an opposite polarity for the other half of the conductive traces.

11. The method of claim 1 where a magnitude of the sheath flow is at least three times higher than a magnitude of aerosol sample flow.

12. The method of claim 1 where a magnitude of the aerosol sample flow and a magnitude of output aerosol flow are equal.

13. The method of claim 1 further including controlling relative humidity of the sheath flow.

14. The method of claim 1 where a charge distribution on the sampled aerosol is inferred through comparison of negative and positive mobility distributions.

15. An aerosol mobility imaging system, comprising:

a chamber formed by a first wall and a second wall, the first and second walls being parallel and separated by a gap, the chamber having a width and a length;

a sheath flow inlet to the chamber, the sheath flow inlet configured to receive a particle free sheath flow;

an aerosol sample inlet configured to receive an aerosol sample flow, the sample inlet located in the first wall, downstream of the sheath flow inlet, such that the aerosol sample flow joins the particle free sheath flow in a laminar manner;

an electrode configured to provide electric field between the first wall and the second wall, the electric field having a strength which varies across the width of the chamber an aerosol flow extraction outlet provided in the second wall and downstream of the sample inlet;

an excess flow outlet downstream of the aerosol flow extraction outlet;

a growth cell coupled to the aerosol flow extraction outlet to receive an extracted aerosol flow, the growth cell including a converging channel and a region of wetted walls with two or more temperature regions such that the particles within the extracted aerosol flow grow by condensation to form droplets within the growth cell, the growth cell configured to maintain laminar flow such that relative positions of droplets exiting the growth cell are indicative of particle electrical mobility, the growth cell having an output; and an imaging system coupled to the output of the growth cell, the imaging system configured to count and capture a spatial position of individual droplets as they exit the growth cell.

16. The system of claim 15 further including a system controller, the controller including instructions causing a processor to:

map a position of the droplets that are imaged onto the electrical mobility of particle at the sample inlet;

calculate a distribution in particle electrical mobilities from the count and mapping, wherein calculate a size distribution of particles based on the distribution in electrical mobilities and an electrical charge distribution of the aerosol at the sample inlet.

17. The system of claim 15 further including a bipolar ion source coupled to the sample inlet and configured to receive the aerosol sample flow prior to the aerosol sample flow passing through the sample inlet.

18. The system of claim 15 wherein the electrode is formed by multiple traces on an printed circuit board, such traces extending in straight lines along a portion of the length of the chamber.

19. The system of claim 15 where a voltage applied each of at least a portion of individual traces increases exponentially with position across the width of the chamber.

20. The system of claim 15 where the excess flow outlet is coupled to an air mover and filter, and excess flow exiting the outlet is reintroduced at the sheath flow inlet.

* * * * *